United States Patent
Kobayashi et al.

(10) Patent No.: US 6,672,337 B2
(45) Date of Patent: Jan. 6, 2004

(54) SERIALLY CONNECTED FLUID HAMMER PREVENTER

(75) Inventors: Tatsuya Kobayashi, Shimizu (JP); Eiji Suzuki, Fuji (JP)

(73) Assignee: Suzuki Sogyo Co., Ltd., Shizuoka (JP)

( * ) Notice: Subject to any disclaimer, the term of this patent is extended or adjusted under 35 U.S.C. 154(b) by 0 days.

(21) Appl. No.: 10/240,217

(22) PCT Filed: Nov. 22, 2001

(86) PCT No.: PCT/JP01/10260

§ 371 (c)(1),
(2), (4) Date: Sep. 30, 2002

(87) PCT Pub. No.: WO02/42677

PCT Pub. Date: May 30, 2002

(65) Prior Publication Data

US 2003/0159743 A1 Aug. 28, 2003

(30) Foreign Application Priority Data

Nov. 24, 2000 (JP) ......................... 2000-357754

(51) Int. Cl.[7] .............................................. F16L 55/04
(52) U.S. Cl. .......................... 138/30; 138/26; 137/207; 220/721
(58) Field of Search .................. 138/30, 31, 26, 138/28; 137/207; 220/720, 721

(56) References Cited

U.S. PATENT DOCUMENTS

| 594,039 | A | * | 11/1897 | Serve | 92/60 |
| 2,474,512 | A | * | 6/1949 | Bechtold et al. | 138/30 |
| 2,495,693 | A | * | 1/1950 | Byrd et al. | 138/30 |
| 2,609,001 | A | * | 9/1952 | Hebard | 138/30 |
| 2,875,788 | A | * | 3/1959 | Pier | 138/30 |
| 3,061,039 | A | * | 10/1962 | Peters | 181/233 |
| 3,066,701 | A | * | 12/1962 | Rothenberg et al. | 138/30 |
| 3,665,967 | A | * | 5/1972 | Kachnik | 138/137 |
| 4,651,781 | A | * | 3/1987 | Kandelman | 138/30 |
| 5,494,076 | A | * | 2/1996 | Knapp | 137/625.17 |
| 5,613,520 | A | * | 3/1997 | Knapp | 137/625.17 |
| 5,816,289 | A | * | 10/1998 | Knapp | 137/625.17 |
| 6,543,485 | B2 | * | 4/2003 | Henry et al. | 138/30 |

FOREIGN PATENT DOCUMENTS

| EP | 1 002 984 A2 | 5/2000 |
| JP | 58-50590 | 11/1983 |
| JP | 61-60202 | 12/1986 |
| JP | 2-253099 | 10/1990 |
| JP | 3-157598 | 7/1991 |
| JP | 3-186691 | 8/1991 |
| JP | 4-22170 | 4/1992 |
| JP | 4-58494 | 9/1992 |
| JP | 6-147391 | 5/1994 |
| JP | 7-28296 | 5/1995 |
| JP | 2521837 | 5/1996 |
| JP | 8-18391 | 8/1996 |
| JP | 8-303678 | 11/1996 |
| JP | 2973847 | 9/1999 |

* cited by examiner

Primary Examiner—Patrick Brinson
(74) Attorney, Agent, or Firm—McGinn & Gibb, PLLC

(57) ABSTRACT

An in-line type fluid hammer prevention device capable of maintaining pressure energy conversion efficiency of elastic cushion for a long time by improving fluid sealing tightness against an elastic cushion by elastic cylindrical diaphragm, wherein an inlet cylindrical connecting body (1) and an outlet connecting body (3) are connected at an intermediate position of fluid channel (R) of a piping system in series, and both ends of a sleeve (5) is positioned between center through-holes (1C, 3C), and a cylindrical diaphragm (7) is placed around the outer periphery side of small holes (5E) provided on the wall of the sleeve (5), and inward lip portions (7A, 7B) at the both ends of the cylindrical diaphragm (7) are pressed and supported by the protrusive flanges (5C, 5D) and the recessed seats (1D, 3D), and an elastic cushion (8) is placed outside the cylindrical diaphragm (7) around the outer periphery side of the small holes (5E) of the sleeve (5).

15 Claims, 17 Drawing Sheets

F I G. 4
(a) 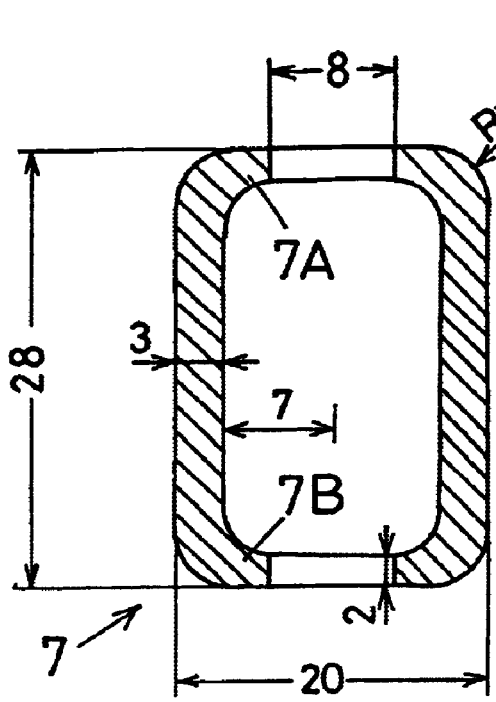 (b) 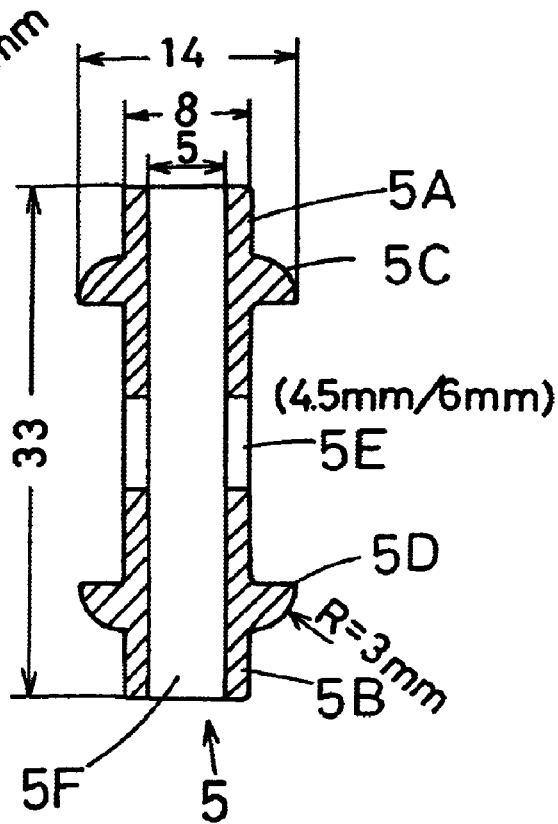
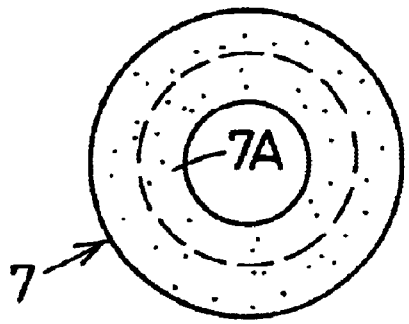

F I G. 6
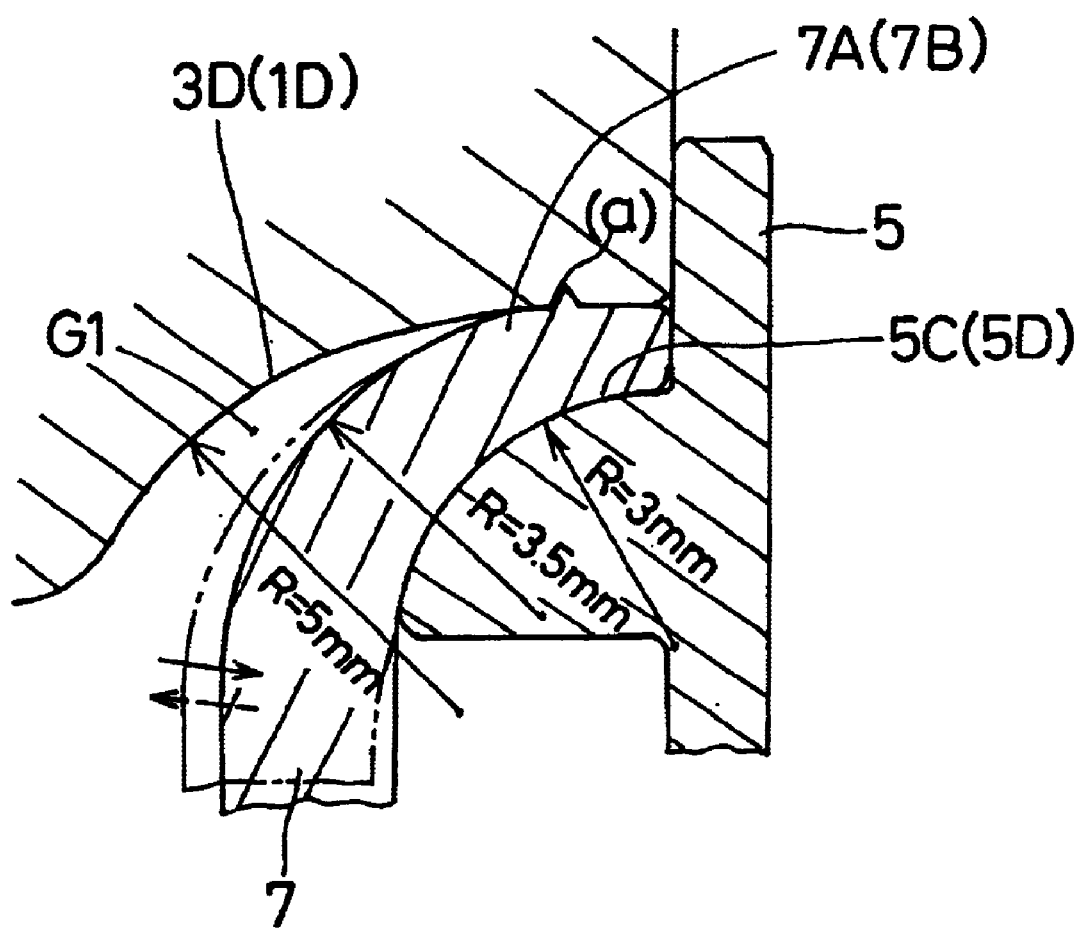

F I G. 1 6
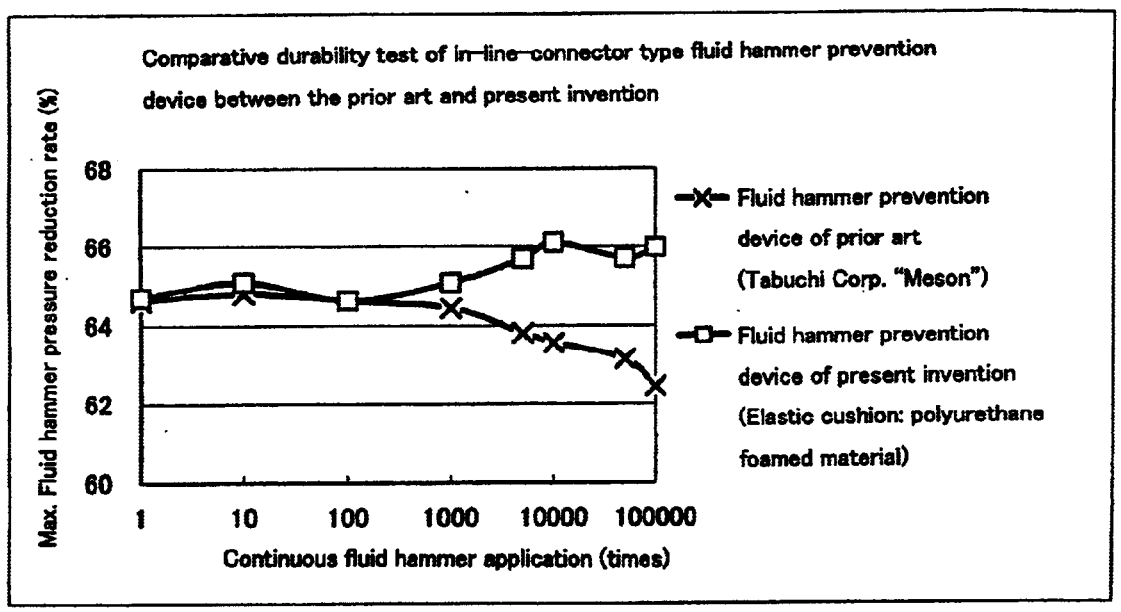

SERIALLY CONNECTED FLUID HAMMER PREVENTER

TECHNICAL FIELD

The present invention relates to an in-line-connector type of fluid hammer prevention device connected in series incorporated in a fluid channel such as a cold/hot water supply system or a fluid apparatus. More particularly, the present invention relates to an in-line fluid hammer prevention device capable of maintaining the pressure energy conversion efficiency for a long period of time by increasing the fluid sealing tightness of an elastic cushion by means of an elastic cylindrical diaphragm.

BACKGROUND ART

There have been several types of fluid hammer prevention device (arrestor) in conventional and popular style, for example known as "water hammer arrestor," which effectively reduce the phenomenon of fluid hammer occurring in a fluid channel such as a cold-hot water supply system or inside a fluid apparatus. The conventional fluid hammer prevention device may be roughly classified into two types, that is, an branch-off type connected at any intermediate position of the fluid channel to introduce the fluid branched from the main channel, and an in-line type in a shape of connector connected in series in a fluid channel such as a water pipe.

In particular, as referred to the Official Gazette of Japanese Patent No. 2908998, there are several products currently available in the market as "water hammer arrestor" having excellent pressure energy fluctuation absorption performance. According to the water hammer prevention device (arrestor) of Japanese Patent No. 2908998, an orifice is placed at the position opposite to a diaphragm and cushion material, "syntactic foam" (or may be called as "synthetic foam") made from the mixture of elastic micro balloon fillers and silicone resin is used as the cushion material, and a two-stage orifice is provided. The conventional branch-off type of fluid hammer prevention device, however, is protruding in the perpendicular direction from the pipe, thus having the problem of poor appearance and design, and of requirement of wider installation space and additional branch-off parts. Consequently, the current branch-off type water hammer arrestors have the problem of being difficult to cope with the demand of down-sizing and cost-reduction of cold/hot water supply system and fluid apparatus.

As the rising of concern about water hammer, the branch-off type of products discussed above have become widely used, and currently the in-line type connected in series in a piping system is drawing attention of many users as the fluid hammer prevention device which may be attached to the pipe by using the minimum space. There have already been disclosed several examples of this in-line type of fluid hammer prevention device as illustrated FIGS. 17(A)–(D), i.e. Japanese Unexamined Patent Publication No. Hei 3-186691, Japanese Unexamined Patent Publication No. Hei 2-253099, Japanese Unexamined Patent Publication No. Hei 6-147391 and Japanese Unexamined Utility Model Publication No. Hei 7-28296.

With reference to the Official Gazette of Japanese Unexamined Patent Publication No. Hei 3-186691, the fluid hammer prevention device as disclosed in FIG. 17(A) shows an embodiment, wherein, a cushion material 7 is fixed on and covers the inner peripheral wall of a connector 8 connected to the pipe at an intermediate point of a standpipe 3 (preferably in the vicinity of a valve 2). The diameter of the inner peripheral wall of the connector 8, in the area between connecting portions 9, 10 at the both ends, are larger by a predetermined value than the diameter of the inner peripheral wall of the standpipe 3, where the cushion material is fixed on and covers the inner wall of the connector 8, so that the whole inner surface in this larger-diameter space may serve as the pressure receiving surface. Further, with reference to the Official Gazette of Japanese Unexamined Patent Publication No. Hei 2-253099, the fluid hammer prevention device as disclosed in FIG. 17(B) shows an embodiment comprising a pressure absorbing body 2, a casing 3 and connectors 4, 5. The pressure absorbing body 2 comprises a cylindrical part 6 and an absorbing chamber 7 formed around the cylindrical part 6. The cylindrical part 6 is made of elastic rubber material, wherein a pressure wave absorbing channel is provided.

Each of the fluid hammer prevention devices discussed above is provided with the portion of larger inner diameter serving as the cushion chamber at an intermediate position of pipe, so that the cylindrical shape of cushion part may be fixed on the cushion chamber. However, since the subject fluid directly passes the pressure transmission passage penetrating through the center of the cushion part, the pressure fluctuation is directly supplied to the cushion part without passing any orifice, the corresponding larger volume of the cushion part according to such pressure fluctuation is required. Thus, the ordinary volume of the cushion part would be insufficient for showing the pressure fluctuation absorption effect.

On the other hand, with reference to the Official Gazette of Japanese Unexamined Patent Publication No. Hei 6-147391, the fluid hammer prevention device as disclosed in FIG. 17(C) shows an embodiment, wherein, a tube 30 made of elastic material such as rubber and serving as a second cylinder inside a cylindrical shape of case 3, is inserted and fitted in a space surrounded by an inner peripheral wall of the case 3 in the shape of cylindrical connector connected to an intermediate position of a pipe "a", and a sponge 31 occupies the space between the outer peripheral surface of the tube 30 and the inner peripheral surface of the case 3. When the pressure fluctuation is generated inside the pipe "a", the pressure fluctuation (pressure wave) may be absorbed while the tube 30 is expanded and presses the sponge 31 due to the generated pressure. According to this structure, although the good durability of cushion part may be expected because the sponge 31 made of elastic material is protected by the tube 30, the pressure fluctuation absorption effect would not be shown thoroughly, since the pressure fluctuation directly affects the cushion part via the tube 30 without passing any small holes, the corresponding larger volume of the cushion part according to such pressure fluctuation is required. Thus, the ordinary volume of the cushion part would provide the limited pressure fluctuation absorption effect, and the problem remains.

FIG. 17(D) of the present invention corresponds to FIG. 4(C) of the Official Gazette of Japanese Unexamined Utility Model Publication No. Hei 7-28296. This prior art is provided with numerous holes 53 on a pipe wall 52a, whereby the sufficient pressure fluctuation absorption effect may be obtained since the pressure fluctuation affects the cushion part filled with a compressive gas by passing through the orifice part. There are several problems, however, in regard to the durability such as that the compressive gas filled in the cushion part chronically goes out through the cushion wall.

The preferable in-line type fluid hammer prevention device would comprise, small holes leading to the fluid channel, a cylindrical diaphragm facing to the small holes with having a space between the diaphragm and the holes, and a cushion material provided around the outer periphery of the cylindrical diaphragm. When this type of fluid hammer prevention device is to be adopted, it is most important how this structure can be accomplished by simple assembly with least cost, at the same time, maintaining the pressure energy conversion efficiency of the cushion part for a long period of time.

DISCLOSURE OF THE INVENTION

The inventors focused on the problems arisen from the conventional type of fluid hammer prevention device as discussed above, and it is an object of the present invention to provide a compact in-line type fluid hammer prevention device, which maintains the superior pressure energy conversion efficiency for a long period of time by securing the fluid sealing tightness by means of the cylindrical diaphragm, and also shows improved pressure fluctuation absorption effect and/or the pressure energy conversion efficiency, by combining small holes leading to the fluid channel, a cylindrical diaphragm facing to the small holes with having a space between the diaphragm and the holes, and a cushion material provided around the outer periphery of the cylindrical diaphragm.

To achieve the objects mentioned above, according to claim 1 of the present invention, there is provided an in-line type fluid hammer prevention device, comprising an inlet cylindrical connecting body and an outlet connecting body connected at an intermediate position of the piping system in series forming a cylindrical space between the inlet cylindrical connecting body and the outlet connecting body. The inlet cylindrical connecting body and the said outlet connecting body are respectively formed a recessed seat facing to each other, each of the recessed seat is provided with a center through-hole at the center position connecting to a fluid channel inside the said pipe. Each end of a cylindrical shape sleeve is positioned at a space between the center through-holes of the inlet cylindrical connecting body and the outlet connecting body. A pair of protrusive flanges is protrusively formed from the sleeve to create gaps between the protrusive flanges and the recessed seats respectively. A cylindrical diaphragm having an elastic characteristic is positioned at an outer periphery of the said sleeve, and the pair of inward lip portions at each end of the cylindrical diaphragm are pressed and supported by the pairs of recessed seats and the protrusive flanges. There is formed a cylindrical chamber between the sleeve and the said cylindrical diaphragm, and the cylindrical chamber is connected to the fluid passage hole inside of the sleeve via a small holes on the wall of the sleeve, and the elastic cushion is placed at the outer periphery of the cylindrical diaphragm.

There is provided an in-line type fluid hammer prevention device comprising an inlet cylindrical connecting body and an outlet connecting body connected at an intermediate position of the piping system in series forming a cylindrical space between the inlet cylindrical connecting body and the outlet connecting body. The inlet cylindrical connecting body and the said outlet connecting body are respectively formed a recessed spherical seat facing to each other, each of the recessed spherical seat is provided with a center through-hole at the center position connecting to a fluid channel inside the said pipe. Each end of a cylindrical shape sleeve is positioned at a space between the center through-holes of the inlet cylindrical connecting body and the outlet connecting body. A pair of protrusive spherical flanges is protrusively formed from the sleeve to create gaps between the protrusive spherical flanges and the recessed spherical seats respectively. A cylindrical diaphragm having an elastic characteristic is positioned at an outer periphery of the said sleeve, and the pair of inward lip portions at each end of the cylindrical diaphragm are pressed and supported by the pairs of recessed spherical seats and the protrusive spherical flanges. There is formed a cylindrical chamber between the sleeve and the said cylindrical diaphragm, and the cylindrical chamber is connected to the fluid passage hole inside of the sleeve via a small holes on the wall of the sleeve, and the elastic cushion is placed at the outer periphery of the cylindrical diaphragm.

The radius of curvature of the recessed spherical seats formed on the inlet cylindrical connecting body and the outlet connecting body is larger than the radius of curvature of outer periphery of the inward lip portions formed at the both end of the cylindrical diaphragm.

The shapes of the recessed seats are multiple angled surfaces protruding toward and recessed from the cylindrical diaphragm, combined with the inward lip portions at the both end of the cylindrical diaphragm having much thicker than the thickness of the mid part of the diaphragm.

The shapes of the recessed seats are right angled protruding toward the cylindrical diaphragm and making gaps showing cranked shape between the recessed seats and the sleeve, combined with the lip portions at the both end of the cylindrical diaphragm having cranked shape being depressed toward the inner edge of spherical flange of the sleeve.

The elastic cushion is made of syntactic foam prepared by adding micro elastic balloon fillers to a base material made of gel or rubber.

And, the elastic cushion is made of foamed material of which initial hardness falls under the range of "Asker C 30 and 85" according to Japanese Industrial Standard S 6050 measured by the level gauge of a durometer "Asker C" manufactured by Kobunshi Keiki Co., Ltd. of Kyoto, Japan, and of which apparent specific gravity falls under the range of 0.30 and 0.70.

With this structure, the inlet cylindrical connecting body and the outlet connecting body are connected at an intermediate position of the piping system in series. There are center through-holes provided at the center positions of both the inlet cylindrical connecting body and outlet connecting body, therefore the fluid flows through the in-line type fluid hammer prevention device. The both ends of the sleeve are positioned in the center through-holes facing to each other, thereof the cylindrical diaphragm is placed around the sleeve. The inward lip portions formed at the end of the cylindrical diaphragm are pressed and held by the protrusive flanges formed at the vicinity of the end parts of the sleeve, against the recessed seats of the inlet and outlet connecting body while assembling, and secure the water tightness of the elastic cushion. Accordingly, the fluid entering the center through-hole completely moves to the fluid passage inside of the sleeve without leaking out of cylindrical diaphragm. It is commonly known that the energy conversion efficiency of elastic cushion is in proportion to the displacement amount of the elastic cushion and to the inner friction effect, and when the elastic cushion is placed in the fluid channel, the fluid will go around the all surface of the elastic cushion in a short time, thus the elastic cushion is seen as if it were placed in the fluid. In this case, since fluid has the even pressure transmission characteristic, the energy scatter effect would occur. Eventually the pressure energy might be supplied evenly to every surface of the elastic cushion, thus it would be impossible to obtain the sufficient displacement amount and the inner friction effect necessary for the effective energy conversion. Therefore, as it is clear that the effective energy conversion may be done by small volume elastic cushion under the method of concentrated pressure energy in one direction by not scattering such pressure energy, the pressure energy conversion effect may be maintained for a long period of time by securing the water tightness of the elastic cushion by means of cylindrical diaphragm against the fluid.

As the fluid passage hole of the sleeve and the cylindrical chamber inside the cylindrical diaphragm are connected to each other via small holes provided on the wall of the sleeve, upon the occurrence of pressure fluctuation, first, the pressure energy is partially reduced when passing through the small holes, and further moves outwardly in the circumferential direction, and eventually reaches the cylindrical chamber inside the cylindrical diaphragm. The pressure energy is first reduced by these small holes, and is then transmitted to the elastic cushion via the cylindrical diaphragm. The cylindrical diaphragm will resist against the pressure energy, but expand, and the elastic cushion will also resist against the pressure energy, but is compressed and deformed, therefore, the complex energy conversion including all of the above with the sufficient displacement amount and the inner friction of the elastic cushion will be carried out at the same time.

The spherical surfaces have been formed by the recessed seat formed on the inlet cylindrical connecting body and the outlet connecting body, and by the protrusive spherical flanges protrusively formed at the both ends of the sleeve. When the inlet cylindrical connecting body and the outlet connecting body are assembled with the cylindrical diaphragm and the sleeve its inside, the outer surfaces at the end of the cylindrical diaphragm: formed in accordance with the shape of the inward lip portions are respectively become contact and compressed by the spherical flange of the sleeve against the part of the curved surfaces formed on the inlet cylindrical connecting body and the outlet connecting body, thus the fluid sealing tightness may be secured.

The radius of curvature of the recessed seats formed on the inlet cylindrical connecting body and the outlet connecting body is larger than the radius of curvature of the outer periphery of the inward lip portions formed at the both end of the cylindrical diaphragm. When the inlet cylindrical connecting body and the outlet connecting body are assembled, with the cylindrical diaphragm and the sleeve its inside, the outer surfaces at the end of the cylindrical diaphragm formed in accordance with the shape of the inward lip portions are respectively become contact and compressed by the spherical flange of the sleeve against the part of the curved surfaces formed on the inlet cylindrical connecting body and the outlet connecting body, thus the high fluid sealing tightness may be secured. Further, according to this relation of radius of curvature, while the cylindrical diaphragm repeatedly expands outwardly and retracts inwardly following to the compression and the reacted elasticity of the elastic cushion against the pressure fluctuation is applied to, there will be less possibility of the end portions of the cylindrical diaphragm at the outer periphery of the inward lip portions being worn due to abrasion against the recessed seats formed on the inlet cylindrical connecting body and the outlet connecting body, thus the durability as well as the high fluid sealing tightness against elastic cushion may be secured and maintained for a long time.

The shape of recessed seats formed on the inlet cylindrical connecting body and the outlet connecting body are an multiple angled surfaces protruding toward and recessed from the cylindrical diaphragm, combined with the inward lip portions at the both end of the cylindrical diaphragm having much thicker than the thickness of the mid part of the diaphragm. When the inlet cylindrical connecting body and the outlet connecting body are assembled, with the cylindrical diaphragm and the sleeve its inside, the outer surfaces at the end of the cylindrical diaphragm formed in accordance with the shape of the inward lip portions are respectively become contact and compressed by the spherical flange of the sleeve against the multiple angled surfaces formed on the inlet cylindrical connecting body and the outlet connecting body, thus the high fluid sealing tightness may be secured. In particular, when the cylindrical diaphragm is pressed against multiple angled surfaces of the inlet and outlet connecting bodies, the press margins on the outer surfaces at the end portions of the cylindrical diaphragm are depressed and deformed to fit tightly creating higher and intense contact pressure, thus the fluid sealing tightness will further improve.

The shapes of the recessed seats are right angled protruding toward the cylindrical diaphragm and making gaps showing cranked shape between the recessed seats and the sleeve, combined with the lip portions at the both end of the cylindrical diaphragm having cranked shape being depressed toward the inner edge of spherical flange of the sleeve. When the inlet cylindrical connecting body and the outlet connecting body are assembled, with the cylindrical diaphragm and the sleeve its inside, the outer surfaces at the end of the cylindrical diaphragm formed in accordance with the shape of the inward lip portions are respectively become contact and compressed by the spherical flange of the sleeve against the cranked shape surfaces formed on the inlet cylindrical connecting body and the outlet connecting body, thus the high fluid sealing tightness may be secured.

Since the elastic cushion is made of the syntactic foam prepared by adding elastic micro balloon fillers to a base material such as gel or rubber, and is protected by the cylindrical diaphragm having the elastic characteristic, the excellent pressure fluctuation absorption function may be expressed, and the pressure energy conversion efficiency may be maintained for a long period of time.

Further, since the elastic cushion is made of the foamed material having the initial hardness of "Asker C 30–85" and the apparent specific gravity of 0.30–0.70, and is protected by the cylindrical diaphragm having the elastic characteristic, the excellent pressure fluctuation absorption function may be expressed, and the pressure energy conversion efficiency may be maintained for a long period of time.

BRIEF DESCRIPTION OF DRAWINGS

The invention will be described below in detail with reference to the accompanying drawings, in which:

FIG. 4 is a sectional view of components of the in-line type fluid hammer prevention device according to the first embodiment of the present invention;

FIG. 6 is a sectional view showing the relation of radius of curvature between a recessed sheet, a cylindrical diaphragm and a sleeve;

FIG. 16 is a comparing characteristic chart showing the durability of the in-line type fluid hammer prevention device according to the present invention and those in the prior art.

BEST MODE FOR CARRYING OUT THE INVENTION

First Embodiment

Now an embodiment of the present invention will be described with reference to the accompanied Figures. FIGS. 1 through 6 illustrate an in-line type fluid hammer prevention device 100 according to an embodiment of the present invention, and FIGS. 7 through 11 illustrate the examples of application to the water related devices. Further, Table 1 in this specification shows the experimental results of the performance of the current embodiment of the present invention.

Figure 1:
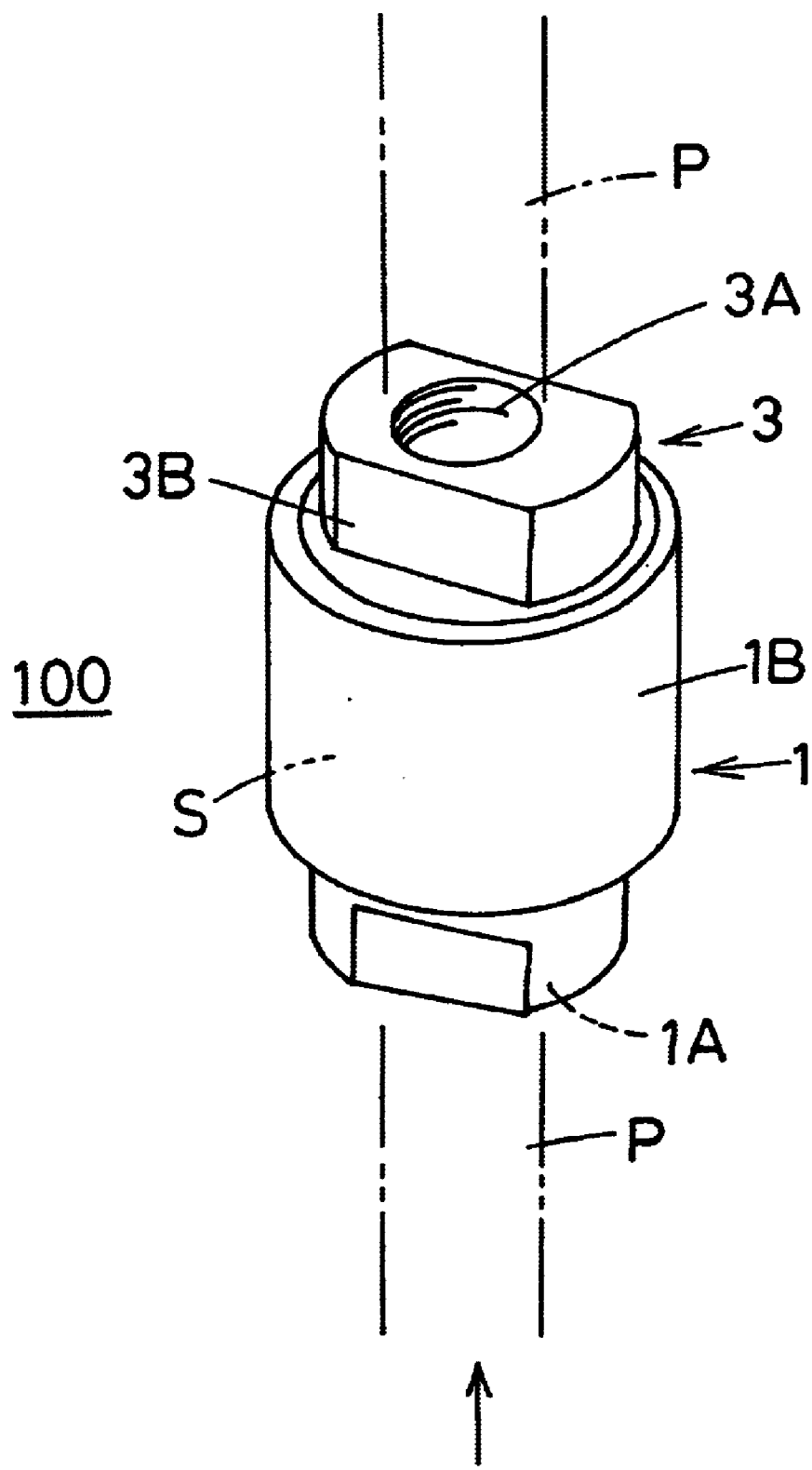
FIG. 1 is a perspective view of an in-line type fluid hammer prevention device according to a first embodiment of the present invention.

As illustrated in FIG. 1, the in-line type fluid hammer prevention device 100 comprises an inlet cylindrical connecting body 1 having a connecting thread portion 1A, and an outlet connecting body 3 having a connecting thread portion 3A, so that the in-line type fluid hammer prevention device 100 may be connected via the connecting thread portions 1A and 3A to a piping system P in series. An outer case 1B of the inlet cylindrical connecting body 1 and a body 3B of the outlet connecting body 3 are connected to each other via the engagement of a female thread 1E with a male thread 3E, whereby a cylindrical space S is formed inside the outer case 1B.

Figure 2:
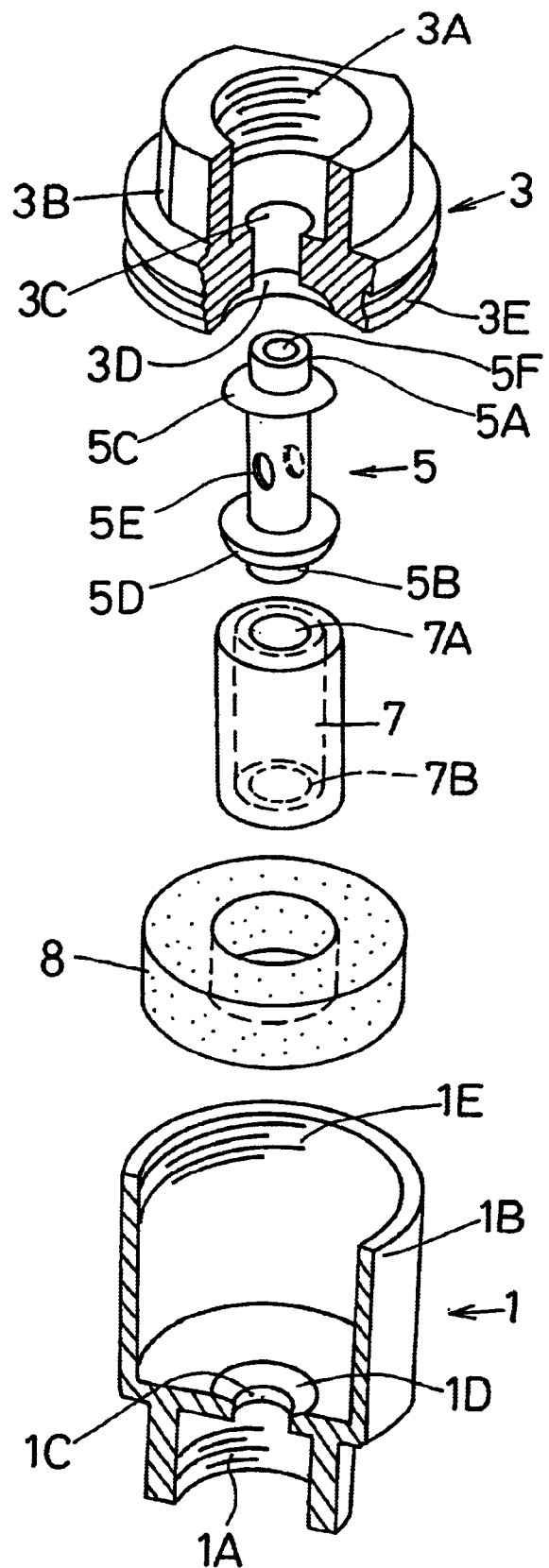
FIG. 2 is an exploded perspective view of the in-line type fluid hammer prevention device according to the first embodiment of the present invention.

The component parts of the in-line type fluid hammer prevention device 100 according to the current embodiment will be discussed with reference to FIGS. 2 and 4. The inlet cylindrical connecting body 1 is provided with the connecting thread portion 1A connected to the pipe P, and with bored center through-hole 1C leading to a fluid channel R inside the pipe P. There is a recessed seat 1D formed on the inner surface of the center through-hole 1C. Further, the female thread 1E is formed at the top of the inner surface of the outer case 1B having the larger diameter than that of the connecting thread portion 1A. The outlet connecting body 3 facing to and being engaged with the inlet cylindrical connecting body 1 is provided with the connecting thread portion 3A connected to the pipe P, and with bored center through-hole 3C also leading to the fluid channel R inside the pipe P. There is also a recessed seat 3D formed on the inner surface of the center through-hole 3C.

Further, the male thread 3E is formed on the outer surface of the body 3B having the larger diameter than that of the connecting thread portion 3A. Both the inlet cylindrical connecting body 1 and the outlet connecting body 3 are made of ordinal metal such as stainless steel, or reinforced resin having high tensile strength, etc., suitable for piping system. The recessed seats 1D, 3D are respectively formed at an optimum radius of curvature, e.g. as 5 mm, by considering the easiness of forming and the abrasion durability of the cylindrical diaphragm.

There is a cylindrical shape of sleeve 5 through which a fluid passage hole 5F is penetrating between end parts 5A, 5B, and two small holes 5E are formed at the substantially intermediate position between the end parts 5A and 5B. The end part 5A is inserted in the center through-hole 3C of the outlet connecting body 3, and the other end part 5B is inserted in the center through-hole 1C of the inlet cylindrical connecting body 1. There is a protrusive spherical flange 5C in the vicinity of the end part 5A, and there is another protrusive spherical flange 5D in the vicinity of the end part 5B. The radius of curvature of the protrusive spherical flanges 5C, 5D has been set to a small value, i.e. as 3 mm. The sleeve 5 is made of ordinal metal such as stainless steel, or reinforced resin having high tensile strength, etc., suitable for piping system.

The cylindrical diaphragm 7 is in a cylindrical shape having an elastic characteristic, attached to and surrounds the outer periphery of the sleeve 5. There are inward lip portions 7A, 7B at the both end of the cylindrical diaphragm 7 respectively protruded inwardly. For reference, also according to the preferable example of the current embodiment, the outer diameter of the cylindrical diaphragm 7 is 20 mm and the overall length thereof is 28 mm, the inner diameter of the inward lip portions 7A, 7B is 8 mm, the radius of curvature of the outer surface of the inward lip portions is 3.5 mm, and the inner diameter of the cylindrical diaphragm is 14 mm. The cylindrical diaphragm 7 may be for example made of millable (heat vulcanizing) silicone rubber having high strength and good durability against wear, and other materials such as a synthetic rubber EPDM may also be used according to the nature of the subject fluid and the characteristic of elastic cushion.

There is an elastic cushion 8 positioned around the cylindrical diaphragm 7, in a cylindrical shape so that the pressure fluctuation energy may be absorbed. The elastic cushion 8 is made of "syntactic foam" prepared by adding elastic micro balloon fillers to a base material, e.g. gel or rubber known in the prior art. This is also known as "synthetic foam", and preferably a syntactic foam made of silicone may be used. If the syntactic foam made of silicone is used, the silicone gel or silicone rubber in which the needle insertion rate under JIS (Japanese Industrial Standard) K 2207 (weight 50 g) is 200 and the rubber hardness under JIS K 6301 is 50 may be appropriate. The diameter of each of elastic micro balloon filler may be between 10 µm or more and 1000 µm, and these elastic micro balloon fillers are added to the base material at the rate of 1–6%.

The silicone rubber may be preferably CX 52-282 manufactured by Dow Corning Toray Silicone Co., Ltd., a material of which hardness is about "Asker C 55". The unit "Asker C" may be expressed according to Japanese Industrial Standard S 6050 measured by the level gauge of a durometer "Asker C" manufactured by Kobunshi Keiki Co., Ltd. of Kyoto, Japan. For reference, the hardness under "Asker C" has been measured under SRIS 0101 (the Standard by the Society of Rubber Industry, Japan) or JIS S 6050 provided as the appropriate unit for measuring the hardness of material such as rubber, foamed elastomer or sponge softer than JIS K 6301 as discussed above. The silicone gel may be preferably CY 52-276 manufactured by Dow Corning Toray Silicone Co., Ltd. It is of course possible to use other material than the above silicone rubber or silicone gel as long as that material has the hardness equal to the above data, the good temperature performance, no risk of leakage by melting, no risk of deterioration, and good durability.

Each of the elastic micro balloon filler added to the material is that of which size is between 10 µm or more and 1000 µm, having a cell made of elastic synthetic resin capable of self elastic deformation. Preferably, "Ekusupanceru" (registered trademark in Japan) manufactured by Nihon Phyllite Co., Ltd. or "Matsumoto Microsphere" (trademark) manufactured by Matsumoto Yushi-Seiyaku Co., Ltd. may be used. In the present embodiment, "Matsumoto Microsphere 80 EDL Series" of which diameter is 30–200 µm is used.

As another example, the elastic cushion 8 may be preferably made of foamed material having the initial hardness of "Asker C 30–85" and the apparent specific gravity of 0.30–0.70. This kind of foamed material may be made of various types of polymer, in this case for example, polyurethane foamed material is used for the elastic cushion. The polyurethane fine foamed material serving as the elastic cushion 8 is a kind of polyurethane foam, having uncountable fine isolated foams. This foamed material may be classified in semi-hard material, but among the semi-hard materials, this is a harder type material. This foamed material is manufactured by utilizing the gas generated when glycol element and di-isocyanate element are reacted by means of water. When this reaction occurs, the glycol element and the di-isocyanate element form the network structure by bridged bound, and at that time, the above gas is generated, which is then used for foaming of the polyurethane fine foamed material. Although there are several types of polyurethane fine foamed material, the one having excellent damping and shock absorption performance and durability, such as that having good reputation as a railroad damper material, could be selected for the polyurethane fine foamed material, since such a railroad damper material would be used, for example, for elastic damper under the railroad ties exposed in tough weather condition and bound by heavy load for a long time. There are prior arts disclosing the manufacturing method of the polyurethane fine foamed material, as the manufacturing method of high-density cellular core polyurethane elastomer for elastic damper under the railroad ties. Those prior arts have been disclosed in Japanese Patent Examined Publications Nos. Sho 58-50590, Sho 61-60202, Hei 4-22170, Hei 4-58494 and Hei 8-18391, and Japanese Patents Nos. 2521837 and 2973847.

The appropriate foamed material discussed above may be that of which initial hardness is "Asker C 30–85" and apparent specific gravity is 0.30–0.70, and the most preferable materiel is available among the products of Nisshinbo Industries, Inc., of Tokyo, Japan, named "Dumplon ES 202" of which specific gravity is 0.30–0.40 (hard type model). This foamed material can serve as the pressure energy conversion medium by securing the predetermined displacement amount due to the elastic characteristic as well as the inner friction (viscoelastic characteristic). Further, this type of foamed material may be set to have the characteristics of high-hardness, and has the excellent mechanical strength and durability, such as the good damping properties and good durability against the repeated compression. In addition, this type of foamed material may maintain the excellent energy absorption and damping performance against the pressure fluctuation for a long time, even under the presumed worst condition for a fluid hammer prevention device such as high temperature and high pressure. This type of foamed material may be formed into any shape at will, which may contribute to the downsizing of the products. It is reported from the experimental results of the performance (which will be discussed afterwards) that this hard type model of "Dumplon ES 202" of which specific gravity is 0.30–0.40 may express the best absorption performance.

The elastic cushion 8 may also be preferably made of "Cell Damper" (trademark) by selecting between the low hardness type BF-300 and the high hardness type BF-500, respectively manufactured by Inoac Corporation, Nagoya, Japan, each one being the foamed polyurethane elastomer having the continuous foams (open-cell) structure. Each material has the effect to absorb the vibration by excellent damping function, and can serve as the pressure energy conversion medium for fluid hammer prevention device having the good effect equal to or even better than that of "Dumplon" series discussed above. Further, as compared with "Dumplon" series comprising isolate foams, "Cell Damper" series has the characteristic of less distortion, the good damping properties and good durability against the repeated compression may be expressed. "Cell Damper" may be formed into any shape at will, and has the good durability against the heat and the cold, with less dependence on temperature. Further, since "Cell Damper" series has the good productivity including that of the secondary process, the reduction of material cost may also be accomplished.

Figure 3:
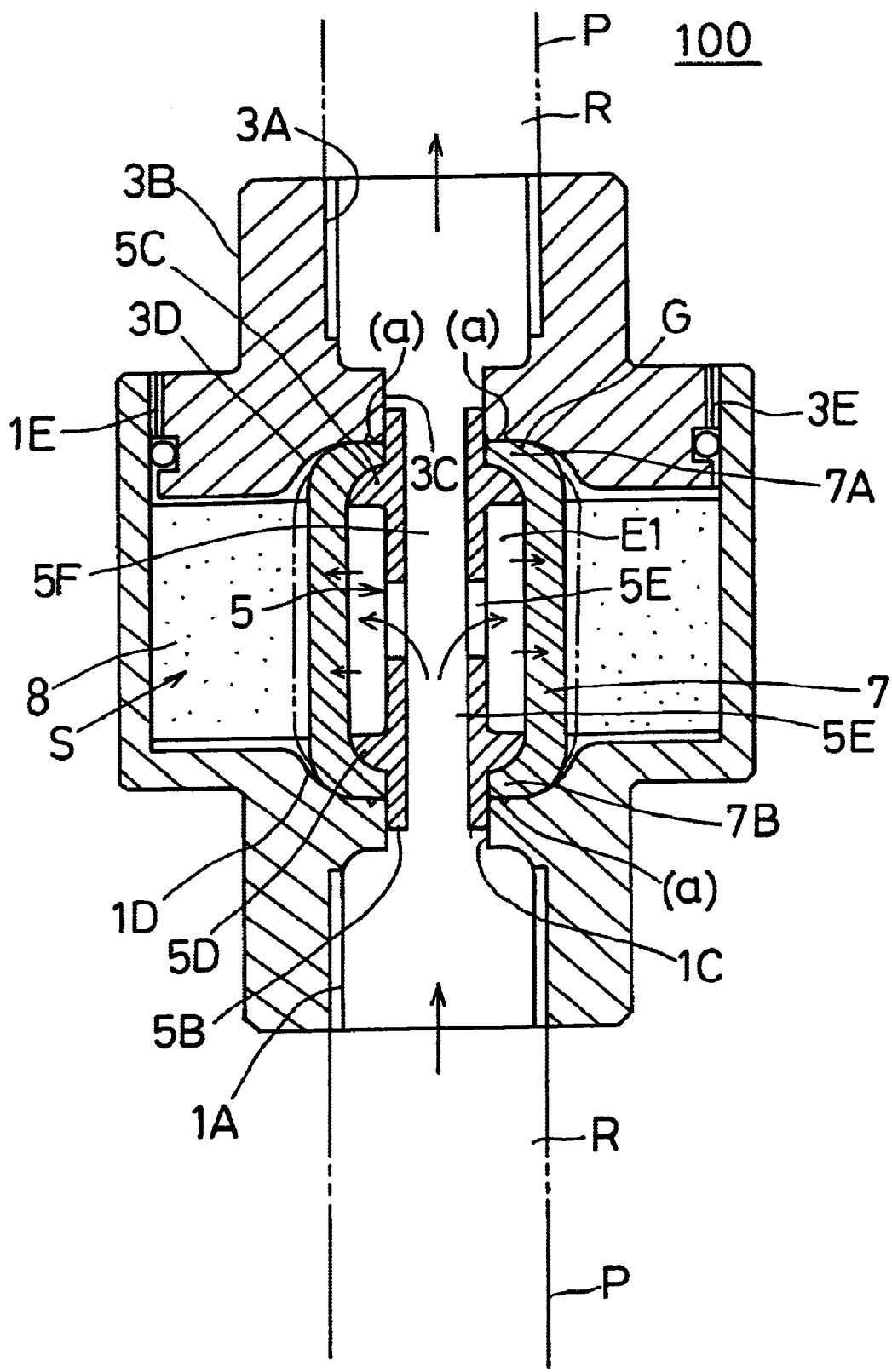
FIG. 3 is a sectional view of the in-line type fluid hammer prevention device according to the first embodiment of the present invention.

The assembly structure of the in-line, type fluid hammer prevention device 100 will now be discussed with reference to FIGS. 3 and 5. The in-line type fluid hammer prevention device 100 comprises the integral combination of inlet cylindrical connecting body 1 with the outlet connecting body 3, whereby the cylindrical space S is formed inside the outer case 1B due to the engagement of the female thread 1E of the outer case 1B with the male thread 3E of the body 3B. The connecting thread portion 1A of the inlet cylindrical connecting body 1 and the connecting thread portion 3A of the outlet connecting body 3 are respectively connected to the pipe P at an intermediate position of piping, so that the in-line type fluid hammer prevention device 100 may be attached in series to the pipe P. Thus the center through-holes 1C of the inlet cylindrical connecting body 1 and the other center through-holes 3C of the outlet connecting body 3 are respectively connected to the fluid channel inside the pipe P. There are the recessed seats 1D, 3D formed respectively around the center through-holes 1C, 3D and facing to each other at the opposite position.

The end parts 5A, 5B of the sleeve 5 are respectively inserted in and positioned at the space between the center through-holes 1C and 3C. The protrusive spherical flanges 5C, 5D protrusively formed in the vicinity of the end parts 5A, 5B are respectively facing to the recessed seats 1D, 3D, each having a few millimeters of gap G. The cylindrical diaphragm 7 having the elastic characteristic is placed around the outer periphery of the sleeve 5 with having a space between them, so that the cylindrical diaphragm 7 may cover the sleeve 5 by forming a cylindrical shape of cylindrical chamber E1 between them. The cylindrical diaphragm 7 has the inward lip portions 7A, 7B formed at the both end, and each of the inward lip portions 7A, 7B is inserted and pressed in the gap G. At that time, the inward lip portions 7A, 7B are pressed and supported by the recessed seats 1D, 3D and the protrusive spherical flanges 5C, 5D, and compressed by about 0.5 mm. The pressed amount of the inward lip portions 7A, 7B is adjusted by minute adjustment of the degree of engagement of the female thread 1E of the inlet cylindrical connecting body 1 with the male thread 3E of the outlet connecting body 3, and upon the best degree of engagement being found, the rotative engagement of the inlet cylindrical connecting body 1 with the outlet connecting body 3 is fixed at that position. As illustrated in FIG. 5, according to this adjustment, the appropriate fluid sealing tightness is secured between the pressure receiving surfaces of the cylindrical diaphragm 7 and the respective recessed seats 1D, 3D, as well as those of the cylindrical diaphragm 7 and the respective protrusive spherical flanges 5C, 5D, whereby the expansion and retraction of the cylindrical diaphragm 7 due to pressure fluctuation is permitted.

Although it is possible to set the radius of curvature of the recessed seats 1D, 3D, that of the outer periphery of the inward lip portions 7A, 7B of the cylindrical diaphragm 7, and that of the protrusive spherical flanges 5C, 5D, to the identical value, it is preferable, as an example, to set the radius of curvature of the recessed seats 1D, 3D to 5 mm, that of the outer periphery of the inward lip portions 7A, 7B of the cylindrical diaphragm 7 to 3.5 mm, and that of the protrusive spherical flanges 5C, 5D to 3 mm (see FIG. 6), so that there is the relation of the radius of curvature as "the recessed seats 1D, 3D>the outer periphery of the inward lip portions 7A, 7B of the cylindrical diaphragm 7>the protrusive spherical flanges 5C, 5D". Consequently, a clearance G1 may be formed between the outer periphery of the inward lip portions 7A, 7B of the cylindrical diaphragm 7 and the recessed seats 1D, 3D with having the room for displacement volume, hence there will be less possibility of abrasion of inward lip portions 7A, 7B with the recessed seats 1D, 3D following to the compression characteristic of the elastic cushion 8 due to pressure fluctuation, since the recessed seats 1D, 3D have the larger radius of curvature than that of the inward lip portions 7A, 7B, whereby the durability of the end portions (press and support portions) of the cylindrical diaphragm 7 may be maintained for a long time. Further, there is a ring groove "a" hollowly provided on the surface of the recessed seat 1D, and the same ring groove "a" is also provided on the surface of the other recessed seat 3D. These ring grooves "a" further secure the higher fluid sealing tightness due to the intense pressures created at the edges of respective ring grooves "a" against the inward lip portions 7A, 7B.

The fluid passage hole 5F of the sleeve 5 is connected to the cylindrical space inside the cylindrical diaphragm 7 via the small holes 5E provided on the wall of the sleeve 5. The elastic cushion 8 is placed on the outer peripheral side of the cylindrical diaphragm 7. The small holes provided on the wall of the sleeve 5 perform as orifices, providing pressure reduction function and frequency conversion function of the pressure wave, so that the pressure fluctuation may be partially reduced. The number, position and diameter of the small holes 5E provided on the wall of the sleeve 5 shall be adjusted according to the subject fluid, use, permitted flow amount range, material of pipe, etc. There are two holes provided facing to each other at the opposite position according to the current embodiment, it is of course possible to provide three holes, and the number and position may be determined arbitrarily.

The in-line type fluid hammer prevention device 100 as discussed above is connected at an intermediate position of the pipe P used for piping system, in a shape of connector also serving as a part of the fluid channel flowing in the piping, and the overall size of the in-line type fluid hammer prevention device is remarkably small. According to the current embodiment as illustrated in FIG. 3, the diameter of the fluid passage hole 5F of the sleeve 5 is smaller than that of the piping system. Consequently, like the function of the small holes 5E, even at the stage when the pressure fluctuation enters the fluid passage hole 5F of the sleeve 5, the fluid passage hole 5F may also reduce the pressure fluctuation by serving as an orifice, likewise the pressure reduction and frequency conversion function of the small holes 5E.

Figure 7:
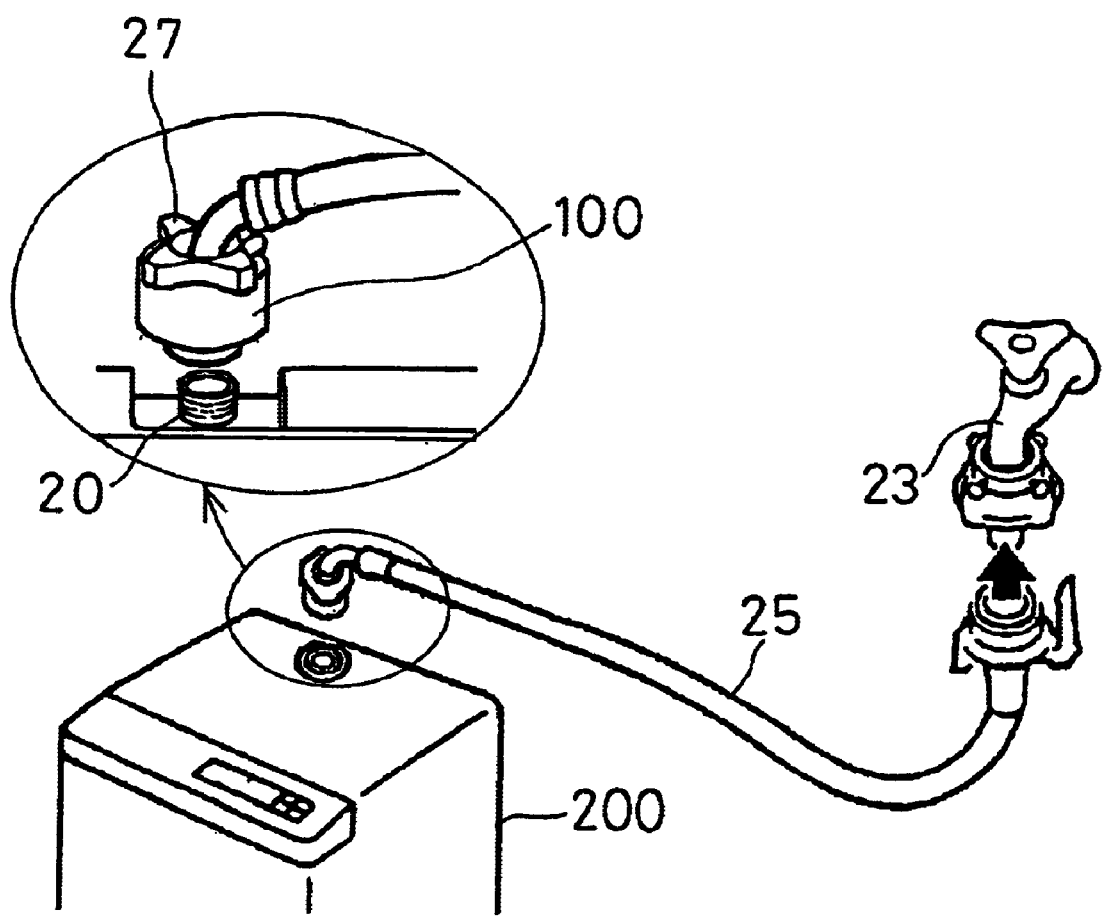
FIG. 7 is a perspective view showing an example of application of the in-line type fluid hammer prevention device according to the present invention.
Figure 8:
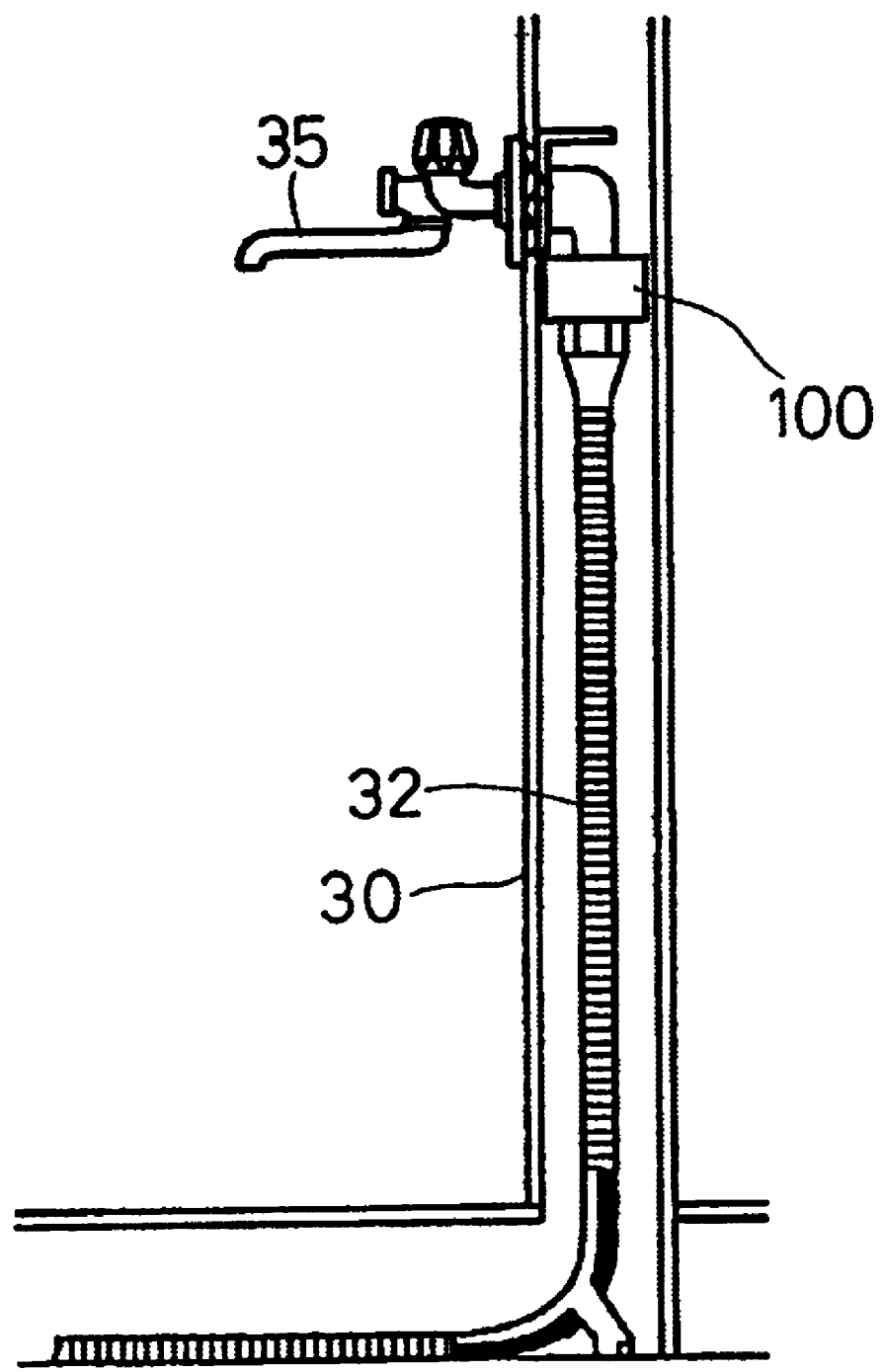
FIG. 8 is a schematic sectional view showing an example of application of the in-line type fluid hammer prevention device according to the present invention.
Figure 9:
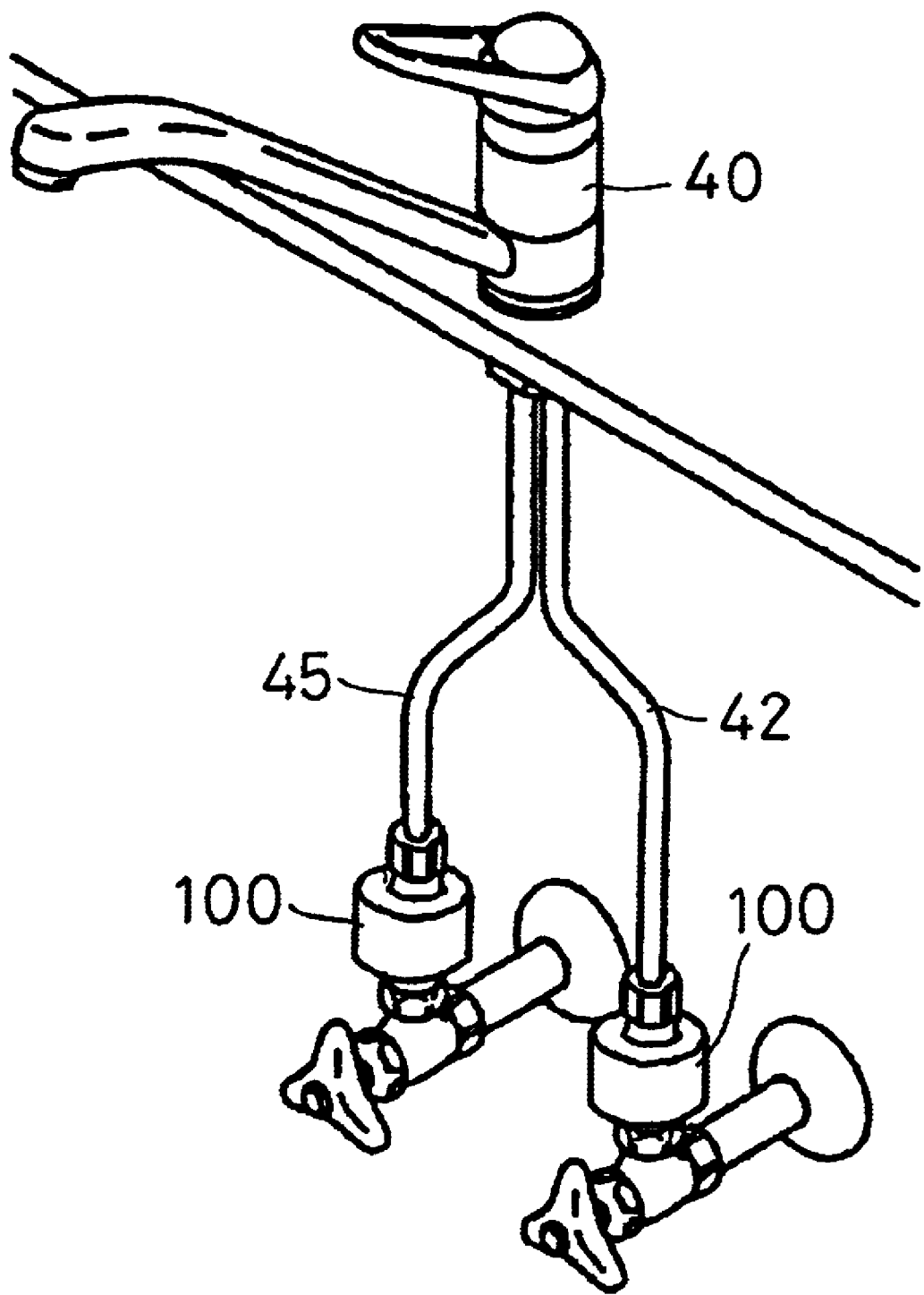
FIG. 9 is a perspective view showing an example of application of the in-line type fluid hammer prevention device according to the present invention.
Figure 10:
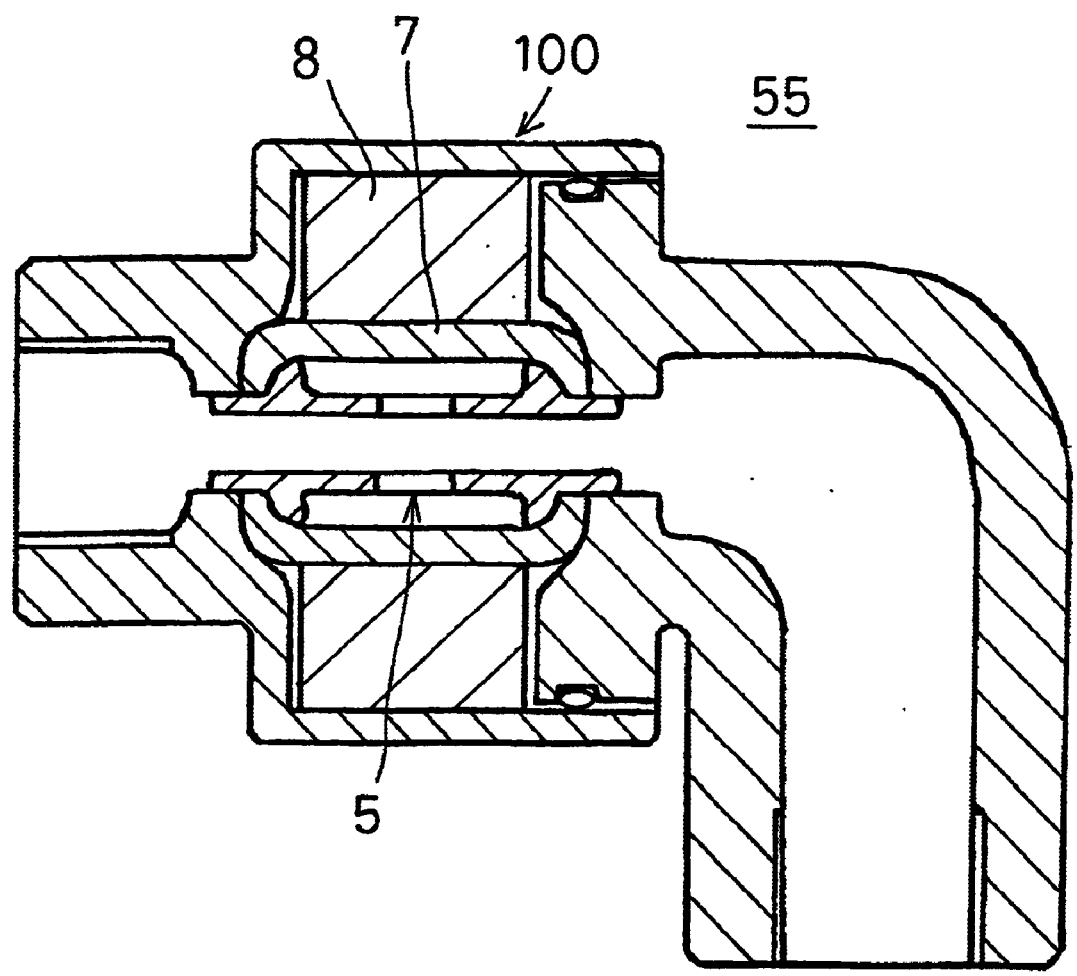
FIG. 10 is a sectional view of in-line type fluid hammer prevention devices according to several examples of prior art.
Figure 11:
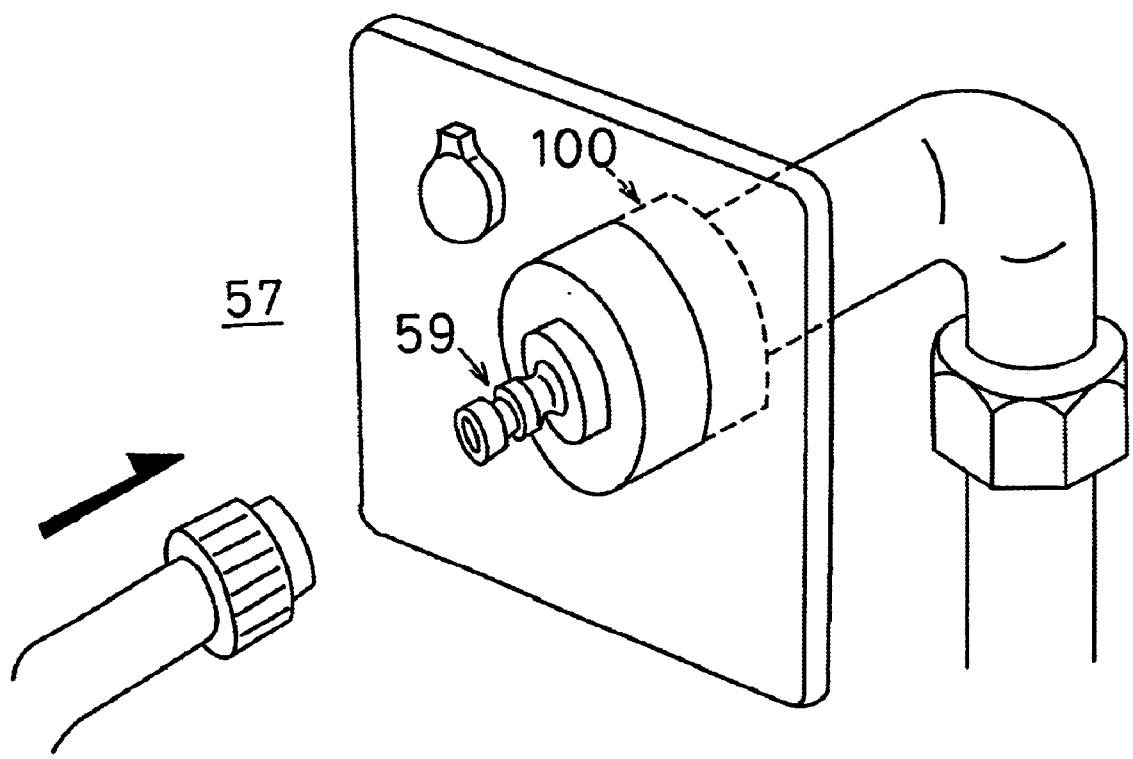
FIG. 11 is a perspective view showing an example of application of the in-line type fluid hammer prevention device according to the present invention.

The examples of application of this in-line type fluid hammer prevention device 100 will now be described with reference to FIGS. 7 through 11. FIG. 7 is the overall view illustrating the application of the in-line type fluid hammer prevention device enclosed in a connector 27 of the hose 25 connecting between a water inlet 20 of an automatic washing machine 200 and a faucet 23. FIG. 8 is a schematic sectional view showing the state behind a wall 30 that the in-line type fluid hammer prevention device 100 is attached to a pipe 32 alternative to any device such as a connector necessary for connecting the pipe 32 to a faucet 35. FIG. 9 is a schematic view showing the state that two in-line type fluid hammer prevention device 100 are respectively attached to pipes 42, 45 having reverse flow prevention valves, alternative to any device such as connectors necessary for connecting the pipes 42, 45 to a combination faucet 40. FIG. 10 is a sectional view in which the in-line type fluid hammer prevention device 100 is attached to a faucet elbow 55 used for the bending part of piping. FIG. 11 is a sectional view in which the in-line type fluid hammer prevention device 100 is attached to a connector 59 provided on the wall, serving as a plug 57 for an automatic washing machine.

As discussed above, the in-line type fluid hammer prevention device 100 is added to the essential parts of piping. Thus, the countermeasure for fluid hammer has been completed when the device is selected or attached, the existing space may be used effectively, and there is no need to change the mechanism of the subject machine regardless whether such a machine is the old type or the new. Further, the necessary specification may be identified easily since the attachment position affecting to the fluid hammer prevention is fixed, which may contribute to the downsizing.

The function of the in-line type fluid hammer prevention device according to the embodiment of the present invention will now be discussed. The inlet cylindrical connecting body 1 and the outlet connecting body 3 are connected at an intermediate position of the piping system in series. There are center through-holes 1C, 3C respectively provided at the center positions of both the inlet cylindrical connecting body 1 and the outlet connecting body 3, and as the center through-holes 1C, 3C are both leading to the fluid channel R of the piping, the fluid enters the in-line type fluid hammer prevention device 100. The both end parts 5A, 5B of the sleeve 5 are positioned between the center through-hole 1C of the recessed seat 1D and the other center through-hole 3C of the other recessed seat 3D facing to each other at the opposite position. The inward lip portions 7A, 7B formed by the both end portions of the cylindrical diaphragm 7 are pressed and supported by the protrusive spherical flanges 5C, 5D protrusively formed at the vicinity of the both end parts 5A, 5B, and the recessed seats 1D, 3D in order to secure the fluid sealing tightness against the elastic cushion 8.

Accordingly, the fluid entering the center through-holes 1C, 3C completely moves to the inside of the sleeve 5 without leaking out of the gap between the recessed seats 1D, 3D and the outer surface of the cylindrical diaphragm 7 toward the space where the elastic cushion 8 is positioned. As the fluid passage hole 5F of the sleeve 5 and the cylindrical chamber E1 inside the cylindrical diaphragm 7 are connected to each other via small holes 5E provided on the wall of the sleeve 5, upon the occurrence of pressure fluctuation, first, the pressure energy is partially reduced when passing through the small holes 5E, and further moves outwardly in the circumferential direction, and eventually reaches the cylindrical chamber E1 inside the cylindrical diaphragm 7. The pressure energy is first reduced by the small holes 5E, and is then transmitted to the elastic cushion 8 via the cylindrical diaphragm 7. The cylindrical diaphragm 7 will resist against the pressure energy, but expand, and the elastic cushion 8 will also resist against the pressure energy, but is compressed and deformed, therefore, the complex energy conversion including all of the above with the sufficient displacement amount and the inner friction of the elastic cushion will be carried out at the same time.

As discussed above, according to the in-line type fluid hammer prevention device 100, the fluid sealing tightness against the elastic cushion 8 has been improved by means of cylindrical diaphragm 7, thereby the durability is secured, by prohibiting the state that, the fluid would enter into the area around the elastic cushion 8 and the pressure energy would be supplied evenly to every surface of the elastic cushion 8, or the fluid would go inside the elastic cushion 8 and the energy conversion cannot be maintained. Further, as there are small holes 5E provided on the sleeve 5 having the pressure reduction function of the pressure energy and the frequency conversion function of the pressure wave, thereby the partial reduction function of the pressure fluctuation, the total pressure energy conversion performance may improve in spite of this small-sized in-line-connecting type of fluid hammer prevention device.

Figure 5:
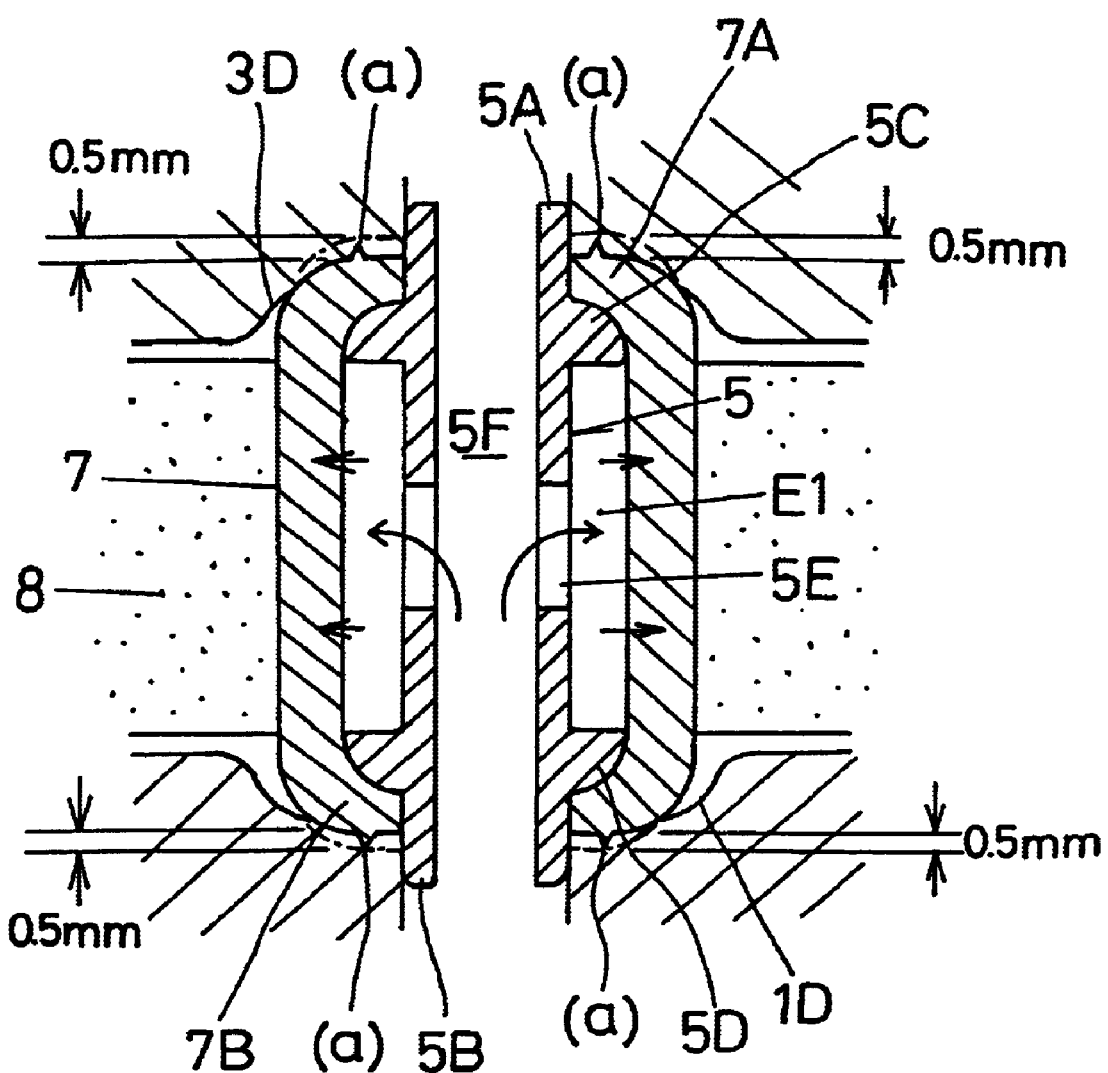
FIG. 5 is a sectional view showing the function of the in-line type fluid hammer prevention device according to the embodiment of the present invention.

Further, as illustrated in FIGS. 5 and 6, the radius of curvature of the recessed seats 1D, 3D formed on the inlet cylindrical connecting body 1 and the outlet connecting body 3 has been set to 5 mm, which is larger than the radius of curvature of the outer periphery of the inward lip portions 7A, 7B formed at the both end portions of the cylindrical diaphragm 7, that has been set to 3.5 mm. When the inlet cylindrical connecting body 1 and the outlet connecting body 3 are assembled, with the cylindrical diaphragm and the sleeve its inside, the outer surfaces at the both end portions of the cylindrical diaphragm 7 formed in accordance with the shape of the inward lip portions 7A, 7B are respectively become contact and compressed by the spherical flange of the sleeve against the curved surfaces formed on the inlet cylindrical connecting body 1 and the outlet connecting body 3, thus the high fluid sealing tightness may be secured. Further, according to this relation of radius of curvature, while the cylindrical diaphragm 7 repeatedly expands outwardly and retracts inwardly following to the compression displacement of the elastic cushion 8 due to the pressure fluctuation and the reacted elasticity, there will be less possibility of the end portions of the cylindrical diaphragm 7 at the outer periphery of the inward lip portions 7A, 7B being worn due to abrasion against the recessed seats 1D, 3D formed on the inlet cylindrical connecting body 1 and the outlet connecting body 3, thus the durability as well as the high fluid sealing tightness against the elastic cushion 8 may be secured and maintained for a long time.

The experimental results of the performance of the in-line type fluid hammer prevention device 100 will be shown as the Table 1 below. Table 1 shows the comparative data between the in-line type fluid hammer prevention device according to a prior art and the in-line type fluid hammer prevention device 100 provided with the elastic cushion according to the present invention, by indicating the outlines of the assessment samples and the criteria of the assessment. The in-line type fluid hammer prevention device according to the prior art is "Meson" manufactured by Tabuchi Corporation, in which the compressed gas has been filled in a piston, and of which structure is substantially disclosed in the Official Gazette of Japanese Patent No. 2827160. According to this prior art, the in-line type fluid (water) hammer prevention device (arrestor) adopts the structure to limit the flow in proportion to the pressure energy, and is comprising, a cylindrical shape of pressure container having a bottom surface, and a slidable piston inserted in this pressure container, wherein gas at a predetermined pressure has been filled inside a space of the pressure container. There is also provided a housing having a room for accommodating the pressure container and provided with a pair of connectors, each of which having an orifice of the same diameter with each other at the deepest inside position. When this water hammer prevention device is installed, the pressure container shall be accommodated so that the moving direction of the piston becomes perpendicular to the fluid channel provided between the pair of connectors.

TABLE 1

| Outlines of Samples | Actual flow amount (L/Min.) | Max. fluid hammer pressure reduction rate (%) |
|---|---|---|
| In-line type fluid hammer prevention device/ prior art (Tabuchi Corp. "Meson") | 12 | 64.7 |
| In-line type fluid hammer prevention device/ present invention (elastic cushion: syntactic foam) | 14 | 64.4 |
| In-line type fluid hammer prevention device/ present invention (elastic cushion: polyurethane isolatedly foamed material "Dumplon ES 202") | 14 | 64.8 |
| In-line type fluid hammer prevention device/ present invention (elastic cushion: polyurethane continuously foamed material "Cell Damper BF 500") | 14 | 64.5 |
| No fluid hammer prevention device provided | 16 | — |

As to the specification of the two samples of in-line type fluid hammer prevention device according to the present invention, the elastic cushion has been set as the most suitable size for the practical use of the hot/cold water supplying system of ordinary house, that is, the overall length as 20 mm and the diameter as 44 mm; the diameter of the small holes 5E of the sleeve 5 are two holes, respectively having the diameter as 4.5 mm. As to the material of the elastic cushion, one of them uses the syntactic foam prepared by adding elastic micro balloon fillers to a base material, e.g. gel or rubber (in the present case, silicone gel CF 5058+elastic micro balloon fillers M 200×

2.2 Wt %), and another uses the polyurethane isolatedly foamed material ("Dumplon ES 202" of which specific gravity is 0.30–0.40), and another uses the polyurethane continuously foamed material ("Cell Dumper BF 500").

The experimental results were as follows: According to the fluid hammer prevention device "Meson" manufactured by Tabuchi Corporation, in which the compressed gas has been filled in a piston, the actual flow amount was 12 (L/min.), and the maximum fluid hammer pressure reduction rate was 64.7%; according to the in-line type fluid hammer prevention device of the present invention in which the syntactic foam was used as the elastic cushion, the actual flow amount was 14 (L/min.), and the maximum fluid hammer pressure reduction rate was 64.4%; according to the in-line type fluid hammer prevention device in which the polyurethane isolatedly foamed material was used as the elastic cushion, the actual flow amount was 14 (L/min.), and the maximum fluid hammer pressure reduction rate was 64.8%; and according to the in-line type fluid hammer prevention device in which the polyurethane continuously foamed material was used as the elastic cushion, the actual flow amount was 14 (L/min.), and the maximum fluid hammer pressure reduction rate was 64.5%. As seen from the above data, as for the maximum fluid hammer pressure reduction rate, the in-line type fluid hammer prevention device 100 according to the present invention showed the good performance equivalent to the branch-type fluid hammer prevention device of the prior art. Further, as to the actual flow amount, the in-line type fluid hammer prevention device 100 according to the present invention showed the performance better than that of the conventional branch-type fluid hammer prevention device. Thus it was proven that the in-line type fluid hammer prevention device 100 prohibited the decrease of flow, and secured the sufficient flow characteristic having no practical problem.

FIG. 16 shows the comparative results of durability test between the in-line type fluid hammer prevention device according to the prior art ("Meson" manufactured by Tabuchi Corporation) and the in-line type fluid hammer prevention device according to the present invention (elastic cushion: polyurethane foamed material "Dumplon ES 202" of which specific gravity was 0.30–0.40). According to the graph of FIG. 16, it is understood that the in-line type fluid hammer prevention device of the present invention (elastic cushion: polyurethane foamed material "Dumplon ES 202" of which specific gravity was 0.30–0.40) could maintain the excellent performance of the maximum fluid hammer pressure reduction rate over 64% until the number of continuous fluid hammer applications reached 100,000 times. On the other hand, according to the same graph, the in-line type fluid hammer prevention device of the prior art ("Meson" manufactured by Tabuchi Corporation) showed the deterioration of maximum fluid hammer pressure reduction rate when the number of continuous fluid hammer applications reached 100,000 times, due to the chronic leakage of compressed gas. When the in-line type fluid hammer prevention device according to the present invention checked upon reaching the number of continuous fluid hammer application at 100,000 times, there was no leakage of water found anywhere from the body, and there found no problem as to the long-term fluid sealing tightness performance.

Second Embodiment

Figure 12:
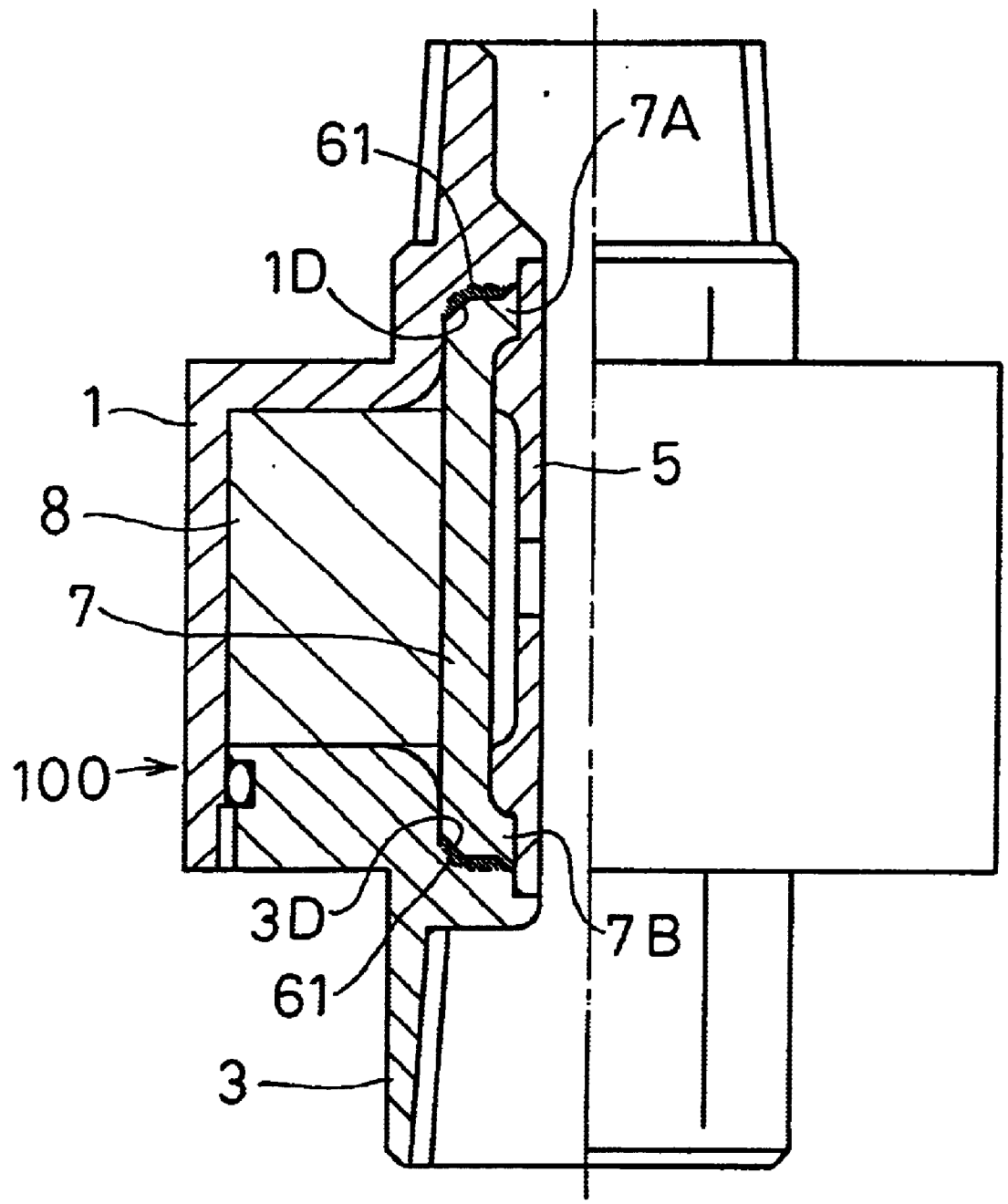
FIG. 12 is a partial sectional view of an in-line type fluid hammer prevention device according to a second embodiment of the present invention.

The in-line type fluid hammer prevention device 100 according to the present invention is of course not limited to the embodiment discussed above. According to the in-line type fluid hammer prevention device 100 of a second embodiment of the present invention as illustrated in FIG. 12, the recessed seats 1D, 3D on the inlet cylindrical connecting body 1 and the outlet connecting body 3, are formed with respectively having an multiple angled protrusive surface. When the inlet cylindrical connecting body 1 and the outlet connecting body 3 are assembled with the cylindrical diaphragm and the sleeve its inside, the outer surfaces at the end portions of the cylindrical diaphragm 7 formed in accordance with the shape of the inward lip portions 7A, 7B are respectively become contact and compressed by the spherical flange of the sleeve against the multiple angled surfaces formed on the inlet cylindrical connecting body 1 and the outlet connecting body 3, thus the high fluid sealing tightness may be secured. In particular, when the cylindrical diaphragm 7 is pressed against multiple angled surfaces of the inlet and outlet connecting bodies while assembling, the press margins 61, 61 on the outer surfaces at the end portions of the cylindrical diaphragm 7 are depressed and deformed to fit tightly creating higher and intense contact pressure, the fluid sealing tightness will further improve.

Third Embodiment

Figure 13:
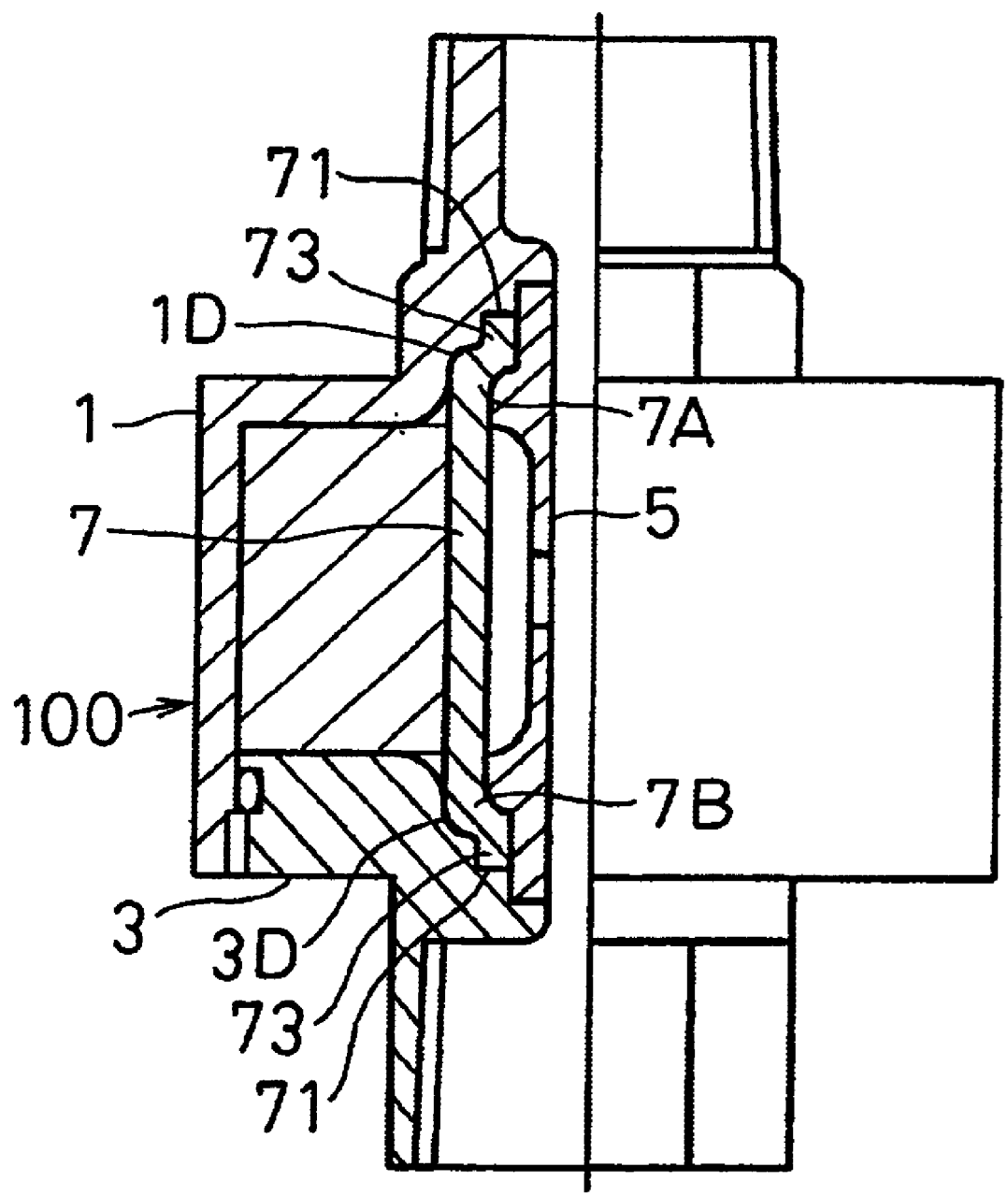
FIG. 13 is a partial sectional view of an in-line type fluid hammer prevention device according to a third embodiment of the present invention.

According to the in-line type fluid hammer prevention device 100 of a third embodiment of the present invention as illustrated in FIG. 13, the recessed seats 1D, 3D formed on the inlet cylindrical connecting body 1 and the outlet connecting body 3 respectively have grooves 71, 71, and also have protrusions 73, 73 at the inward lip portions 7A, 7B at the both ends of the cylindrical diaphragm 7. When the inlet cylindrical connecting body 1 and the outlet connecting body 3 are assembled with the cylindrical diaphragm and the sleeve its inside, the outer surfaces at the end portions of the cylindrical diaphragm 7 formed in accordance with the shape of the inward lip portions 7A, 7B are respectively become contact and compressed by the spherical flange of the sleeve against the recessed seats 1D, 3D with the protrusions 73, 73 and fits into the grooves 71, 71 with intense pressure, thus the high fluid sealing tightness may be secured.

Fourth Embodiment

Figure 14:
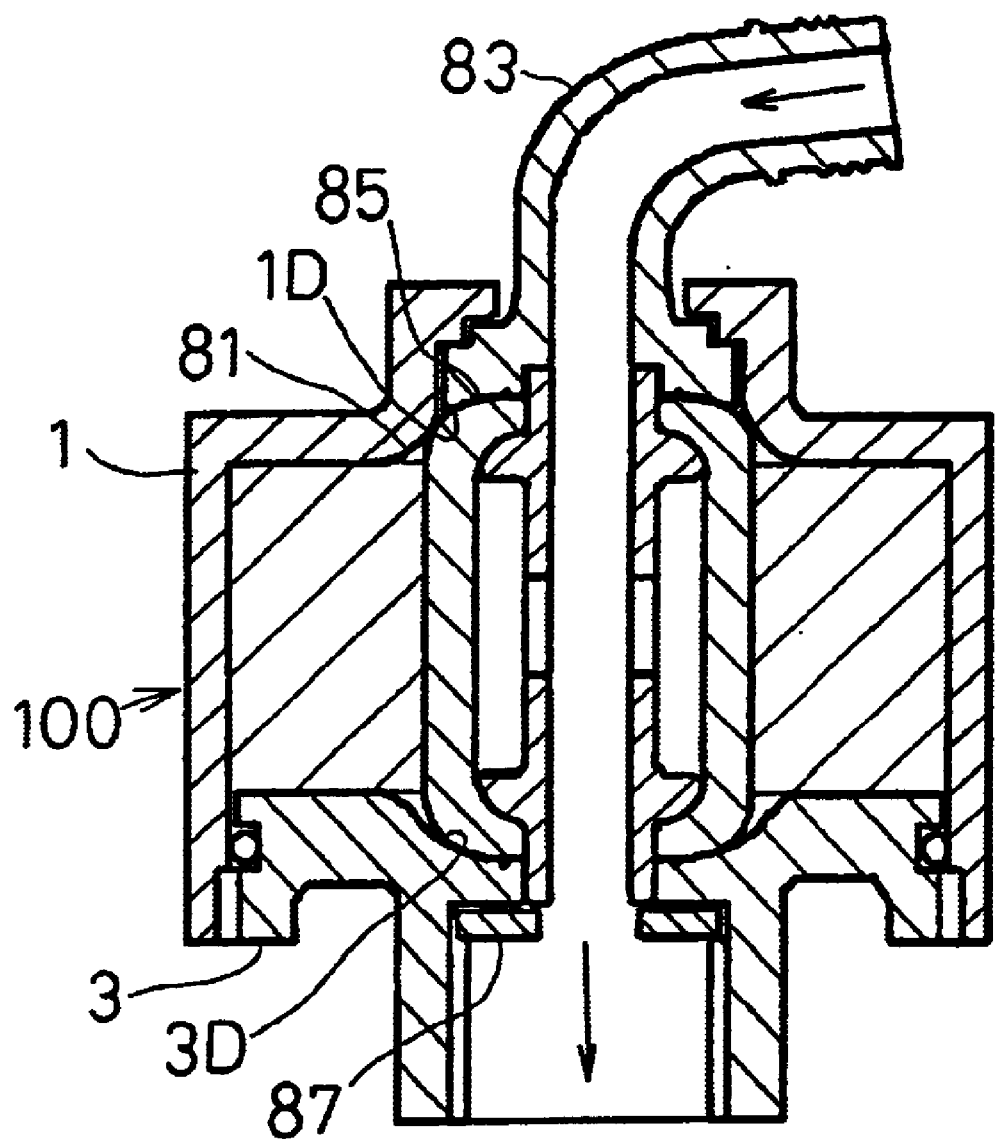
FIG. 14 is a sectional view of an in-line type fluid hammer prevention device according to a fourth embodiment of the present invention.

According a fourth embodiment of the present invention as illustrated in FIG. 14, the in-line type fluid hammer prevention device 100 is incorporated in a connector for a hose of an automatic washing machine, comprising of the recessed seat 1D formed on the inlet cylindrical connecting body 1 comprises, a recessed part 81 of the inlet cylindrical connecting body 1, and another recessed part 85 of a hose connecting pipe 83 rotatively attached to the inlet cylindrical connecting body 1. The recessed seat 3D of the outlet connecting body 3 is in a spherical shape, thereby being able to be connected to the hose plug of the automatic washing machine via a packing 87. When the inlet cylindrical connecting body 1 and the outlet connecting body 3 are assembled with the cylindrical diaphragm and the sleeve its inside, the outer surfaces at the end portions of the cylindrical diaphragm 7 formed in accordance with the shape of the inward lip portions 7A, 7B are respectively pressed and become in tight contact, with the recessed part 81 of the inlet cylindrical connecting body 1, and with the other recessed part 85 of the hose connecting pipe 83 rotatively attached to the inlet cylindrical connecting body 1, thus the high fluid sealing tightness may be secured. Further, the hose connecting pipe 83 may be positioned freely at any angle.

Fifth Embodiment

Figure 15:
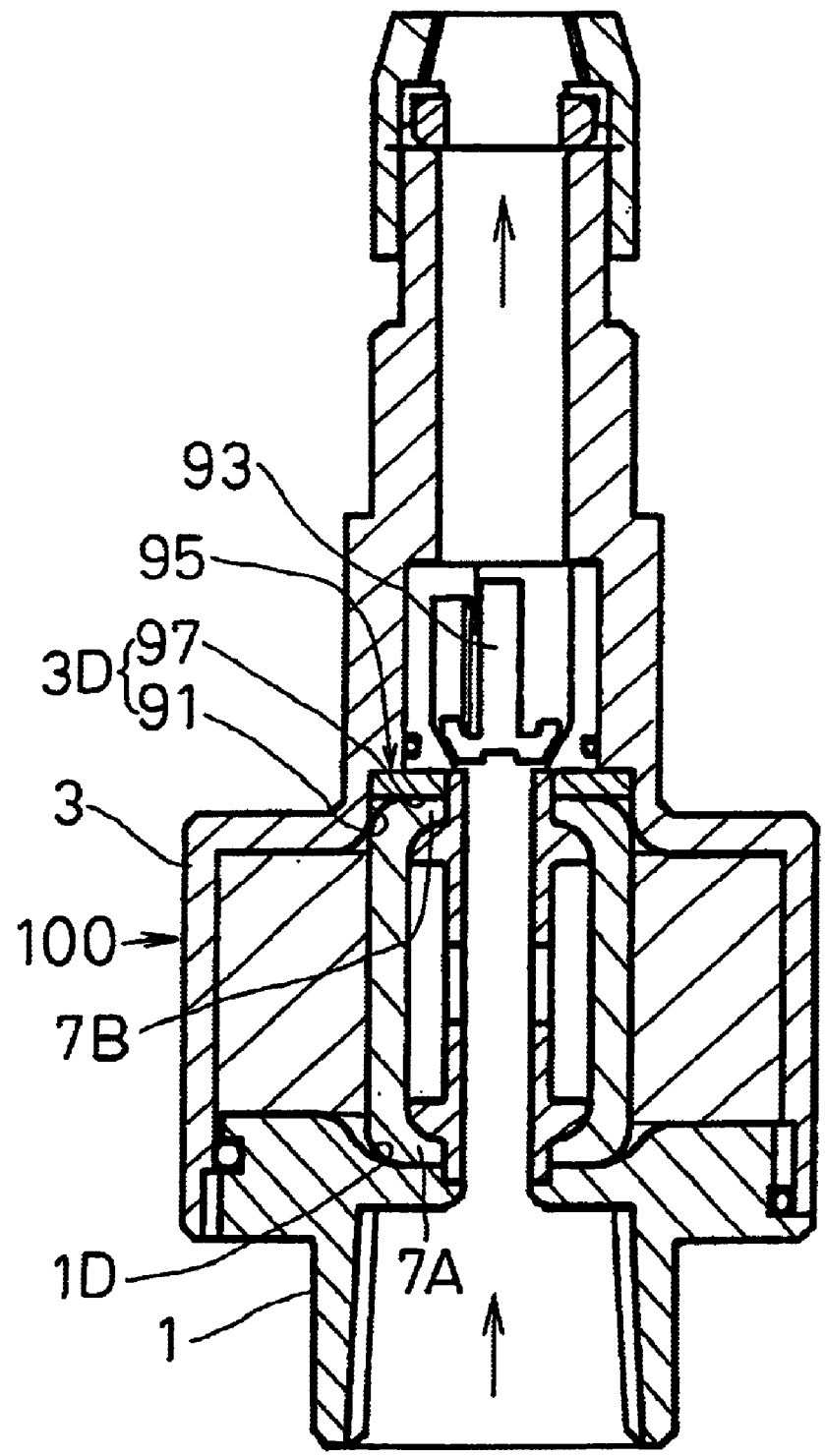
FIG. 15 is a sectional view of an in-line type fluid hammer prevention device according to a fifth embodiment of the present invention.
Figure 17A:
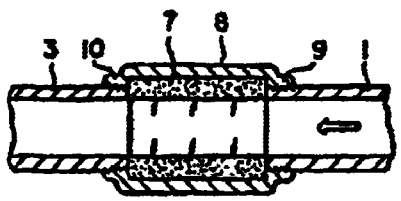
FIG. 17 is a set of sectional views showing in-line type fluid hammer prevention device in the prior art.
Figure 17B:
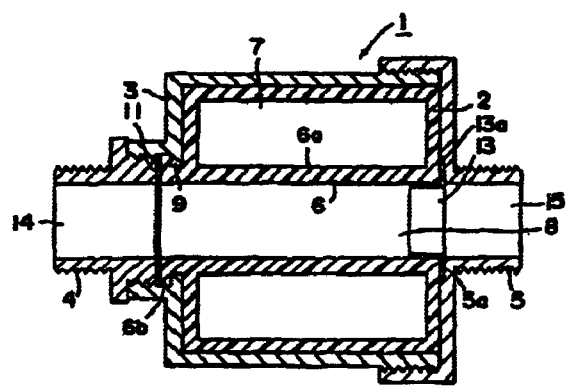
Figure 17C:
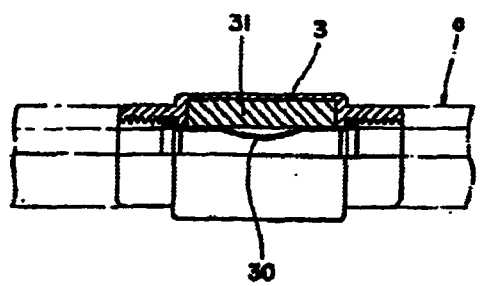
Figure 17D:
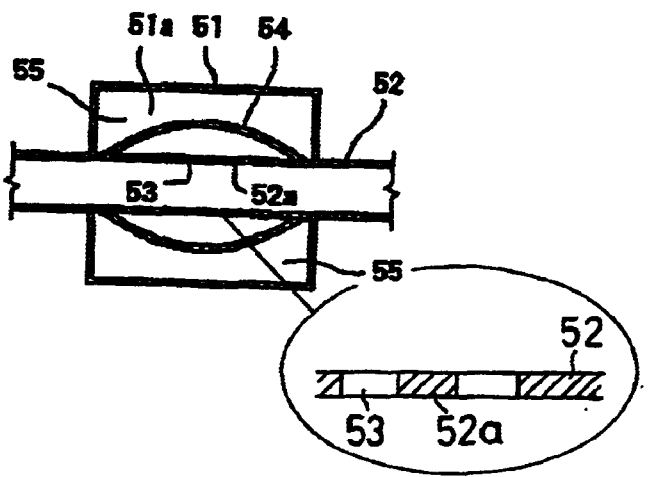

According a fifth embodiment of the present invention as illustrated in FIG. 15, the in-line type fluid hammer prevention device 100 is incorporated in an end part of a water plug. The recessed seat 3D formed on the outlet connecting body 3 comprises, a recessed part 91 of the outlet connecting body 3, and a surface 97 of a packing 95 pressing an anti-reverse flow valve 93 incorporated in the outlet connecting body 3 are assembled as shown forming a substantially right angled recessed surface. The recessed seat 1D of the outlet cylindrical connecting body 1 is in a spherical shape. When the inlet cylindrical connecting body 1 and the outlet connecting body 3 are assembled with the cylindrical diaphragm and the sleeve its inside, the outer surfaces at the end portions of the cylindrical diaphragm 7 formed in accordance with the shape of the inward lip portions 7A, 7B are respectively pressed and become in tight contact with the substantially right angled recessed surface formed by the recessed part 91 of the outlet connecting body 3 and by the surface 97 of the packing 95, thus the high fluid sealing tightness may be secured.

The in-line type fluid hammer prevention device 100 according to the present invention is of course not limited to the embodiment discussed above, and any modification and variation is possible without departing from the spirit and the scope of the present invention. For example, the elastic cushion 8 as above discussed is in a cylindrical shape so that the pressure absorption effect may be expressed in the outward direction of the all circumferential direction. However, the several (e.g. two or three) elastic cushions may be placed in the circumferential direction with having intervals at the positions corresponding to the small holes. Further, the shape of protrusive spherical flanges 5C, 5D is not limited to the spherical shape, and it also be possible to have angled plain surfaces, or a substantially right angled surface. The change of design or material of the other parts and the combination may be done as long as it is not departing the scope of the present invention. The fluid hammer prevention device 100 is of course used for any fluid other than the water.

As discussed above, since the in-line type fluid hammer prevention device comprises, the sleeve with small holes connecting the fluid channel and fluid chamber at the outer periphery of the sleeve, the cylindrical diaphragm facing to these small holes on the outer peripheral side, and the elastic cushion positioned at the outer periphery of the cylindrical diaphragm, upon occurrence of the pressure fluctuation, first, the pressure energy is partially reduced when passing through the small holes, and further moves outwardly in the circumferential direction, and eventually reaches the cylindrical chamber inside the cylindrical diaphragm. The pressure energy is first reduced by these small holes, and is then transmitted to the elastic cushion via the cylindrical diaphragm. The cylindrical diaphragm will resist against pressure energy, but expand, and the elastic cushion will also resist against pressure energy, but is compressed and deformed, therefore, the complex energy conversion including all of the above with sufficient displacement amount and the inner friction of the elastic cushion will be carried out at the same time. Therefore, although the size of the in-line type fluid hammer prevention device according to the present invention is remarkably small, the excellent pressure fluctuation absorption performance may be expressed.

Further, according to the in-line type fluid hammer prevention device according to the present invention, since the inward lip portions provided at the both ends of the cylindrical diaphragm are pressed and supported by the recessed seats of the inlet cylindrical connecting body as well as by the recessed seats of the outlet connecting body, the durability is secured, by prohibiting the state that, the fluid would enter into the side of elastic cushion and the pressure energy would be supplied evenly to every surface of the elastic cushion, or the fluid would go inside the elastic cushion 8 and the energy conversion cannot be maintained. Further, as there are small holes provided on the sleeve having the pressure reduction function of the pressure energy and the frequency conversion function of the pressure wave, thereby the partial reduction function of the pressure fluctuation is added, the total pressure energy conversion performance may improve in spite of this small-sized in-line-connecting type of fluid hammer prevention device.

Since the radius of curvature of the recessed seats formed on both the inlet cylindrical connecting body and the outlet connecting body is larger than the radius of curvature of the outer periphery of the inward lip portions formed on the both ends of the cylindrical diaphragm, when the cylindrical diaphragm repeatedly expands outwardly and retracts inwardly upon receiving the fluid hammer, there is less possibility of inward lip portions of the cylindrical, diaphragm being worn due to abrasion against the recessed seats formed on both the inlet cylindrical connecting body and the outlet connecting body, thus the durability and the high fluid sealing tightness may be secured and maintained for a long time.

Since the radius of curvature of the recessed seats formed on the inlet cylindrical connecting body and the outlet connecting body is larger than the radius of curvature of the outer periphery of the inward lip portions formed at the both ends of the cylindrical diaphragm, while the cylindrical diaphragm repeatedly expands outwardly and retracts inwardly following to the pressure fluctuation amount of the elastic cushion due to pressure fluctuation and the reacted elasticity, there will be less possibility of the end portions of the cylindrical diaphragm at the outer periphery of the inward lip portions being worn due to abrasion against the recessed seats formed on the inlet cylindrical connecting body and the outlet connecting body, thus the durability as well as the high fluid sealing tightness may be secured and maintained for a long time.

Since the recessed seats formed on the inlet cylindrical connecting body and the outlet connecting body are formed with respectively having an multiple angled surfaces protruding inward and recessed from the cylindrical diaphragm, when the inlet cylindrical connecting body and the outlet connecting body are assembled with the cylindrical diaphragm and the sleeve its inside, the outer surfaces at the ends of the cylindrical diaphragm formed in accordance with the shape of the inward lip portions, are respectively become contact and compressed by the spherical flange of the sleeve against the multiple angled surfaces formed on the inlet cylindrical connecting body and the outlet connecting body, thus the high fluid sealing tightness may be secured. In particular, when the cylindrical diaphragm is pressed against multiple angled surfaces of the inlet and outlet connecting bodies when assembled, the press margins on the outer surfaces at the ends of the cylindrical diaphragm are depressed and deformed to fit tightly creating higher and intense contact pressure, thus the fluid sealing tightness will further improve.

Since the recessed seats formed on the inlet cylindrical connecting body and the outlet connecting body are formed by surfaces substantially having a right angle protruding toward the cylindrical diaphragm and making gaps showing cranked shape between the recessed seats and the sleeve, combined with the lip portions at the both ends of the cylindrical diaphragm having cranked shape being depressed toward the inner edge of spherical flange of the sleeve, when the inlet cylindrical connecting body and the outlet connecting body are assembled with the cylindrical diaphragm and the sleeve its inside, the outer surfaces at the end portions of the cylindrical diaphragm formed in accordance with the shape of the inward lip portions are respectively become contact and compressed by the spherical flange of the sleeve against the cranked shape surfaces formed on the inlet cylindrical connecting body and the outlet connecting body, thus the high fluid sealing tightness may be secured.

Since the elastic cushion is made of the syntactic foam prepared by adding elastic micro balloon fillers to a base material such as gel or rubber, and is protected by the cylindrical diaphragm having the elastic characteristic, the excellent pressure fluctuation absorption function may be expressed, and the pressure energy conversion efficiency may be maintained for a long period of time.

Further, since the elastic cushion is made of the foamed material having the initial hardness of "Asker C 30–85" and the apparent specific gravity of 0.30–0.70, and is protected by the cylindrical diaphragm having the elastic characteristic, the excellent pressure fluctuation absorption function may be expressed, and the pressure energy conversion efficiency may be maintained for a long period of time.

What is claimed is:

1. An in-line type fluid hammer prevention device comprising an inlet cylindrical connecting body and an outlet connecting body connected at an intermediate position of piping system in series in order to form a cylindrical space between said inlet cylindrical connecting body and said outlet connecting body, wherein:

said inlet cylindrical connecting body and said outlet connecting body respectively forming a recessed seat facing to each other, each of said recessed seats being provided with a center through-hole at the center position connecting to a fluid channel inside said pipe;

end parts of a cylindrical shape sleeve being positioned at a space between said center through-holes of said inlet cylindrical connecting body and said outlet connecting body;

a pair of protrusive flanges protrusively formed from said sleeve being positioned opposite to each other by respectively having a gap between said protrusive flanges and said recessed seats;

a cylindrical diaphragm having an elastic characteristic being positioned at an outer periphery of said sleeve;

a pair of inward lip portions formed inwardly protruding at each end of said cylindrical diaphragm being pressed and supported at said gaps by said recessed seats and said protrusive flanges;

said sleeve having small holes on a wall of said sleeve, connecting a cylindrical chamber formed by said sleeve and an inner periphery of said cylindrical diaphragm and a passage hole inside said sleeve; and an elastic cushion being placed at a position inside said cylindrical space on the outer periphery of said cylindrical diaphragm.

2. An in-line type fluid hammer prevention device comprising an inlet cylindrical connecting body and an outlet connecting body connected at an intermediate position of said pipe in series in order to form a cylindrical space between said inlet cylindrical connecting body and said outlet connecting body, wherein:

said inlet cylindrical connecting body and said outlet connecting body respectively forming a recessed spherical seat facing to each other, each of said recessed spherical seats being provided with a center through-hole at the center position connecting to a fluid channel inside said pipe;

end parts of a cylindrical shape sleeve being positioned at a space between said center through-holes of said inlet cylindrical connecting body and said outlet connecting body;

a pair of protrusive spherical flanges protrusively formed from said sleeve being positioned opposite to each other by respectively having a gap between said protrusive spherical flanges and said recessed spherical seats;

a cylindrical diaphragm having an elastic characteristic being positioned at an outer periphery of said sleeve;

a pair of inward lip portions formed inwardly protruding at each end of said cylindrical diaphragm being pressed and supported at said gaps by said recessed spherical seats and said protrusive spherical flanges;

said sleeve having small holes on a wall of said sleeve connecting a cylindrical chamber formed by said sleeve and an inner periphery of said cylindrical diaphragm and a passage hole inside said sleeve; and an elastic cushion being placed at a position inside said cylindrical space on the outer periphery of said cylindrical diaphragm.

3. The in-line type fluid hammer prevention device as claimed in claim 2, wherein, a radius of curvature of said recessed spherical seats formed on said inlet cylindrical connecting body and said outlet connecting body being larger than a radius of curvature of an outer periphery of said inward lip portions formed at both end portions of said cylindrical diaphragm.

4. The in-line type fluid hammer prevention device as claimed in claim 1, wherein said recessed seats being formed by multiple angled surfaces protruding toward said cylindrical diaphragm.

5. The in-line type fluid hammer prevention device as claimed in claim 1, wherein said recessed seats being formed by surfaces having a substantially right angle.

6. The in-line type fluid hammer prevention device as claimed in claim 1, wherein said elastic cushion comprises syntactic foam prepared by adding elastic micro balloon fillers to a base material made of gel or rubber.

7. The in-line type fluid hammer prevention device as claimed in claim 1, wherein said elastic cushion comprises foamed material of which initial hardness falls under the range of "Asker C 30 and 85" according to Japanese Industrial Standard S 6050 measured by the level gauge of a durometer "Asker C" manufactured by Kobunshi Keiki Co., Ltd. of Kyoto, Japan, and of which apparent specific gravity falls under the range of 0.30 and 0.70.

8. The in-line type fluid hammer prevention device as claimed in claim 2, wherein said elastic cushion comprises syntactic foam prepared by adding elastic micro balloon fillers to a base material made of gel or rubber.

9. The in-line type fluid hammer prevention device as claimed in claim 3, wherein said elastic cushion comprises syntactic foam prepared by adding elastic micro balloon fillers to a base material made of gel or rubber.

10. The in-line type fluid hammer prevention device as claimed in claim 4, wherein said elastic cushion comprises syntactic foam prepared by adding elastic micro balloon fillers to a base material made of gel or rubber.

11. The in-line type fluid hammer prevention device as claimed in claim 5, wherein said elastic cushion comprises syntactic foam prepared by adding elastic micro balloon fillers to a base material made of gel or rubber.

12. The in-line type fluid hammer prevention device as claimed in claim 2, wherein said elastic cushion comprises foamed material of which initial hardness falls under the range of "Asker C 30 and 85" according to Japanese Industrial Standard S 6050 measured by the level gauge of a durometer "Asker C" manufactured by Kobunshi Keiki Co., Ltd. of Kyoto, Japan, and of which apparent specific gravity falls under the range of 0.30 and 0.70.

13. The in-line type fluid hammer prevention device as claimed in claim 3, wherein said elastic cushion comprises foamed material of which initial hardness falls under the range of "Asker C 30 and 85" according to Japanese Industrial Standard S 6050 measured by the level gauge of a durometer "Asker C" manufactured by Kobunshi Keiki Co., Ltd. of Kyoto, Japan, and of which apparent specific gravity falls under the range of 0.30 and 0.70.

14. The in-line type fluid hammer prevention device as claimed in claim 4, wherein said elastic cushion comprises foamed material of which initial hardness falls under the range of "Asker C 30 and 85" according to Japanese Industrial Standard S 6050 measured by the level gauge of a durometer "Asker C" manufactured by Kobunshi Keiki Co., Ltd. of Kyoto, Japan, and of which apparent specific gravity falls under the range of 0.30 and 0.70.

15. The in-line type fluid hammer prevention device as claimed in claim 5, wherein said elastic cushion comprises foamed material of which initial hardness falls under the range of "Asker C 30 and 85" according to Japanese Industrial Standard S 6050 measured by the level gauge of a durometer "Asker C" manufactured by Kobunshi Keiki Co., Ltd. of Kyoto, Japan, and of which apparent specific gravity falls under the range of 0.30 and 0.70.

* * * * *